US006813335B2

(12) United States Patent
Shinbata

(10) Patent No.: US 6,813,335 B2
(45) Date of Patent: Nov. 2, 2004

(54) IMAGE PROCESSING APPARATUS, IMAGE PROCESSING SYSTEM, IMAGE PROCESSING METHOD, PROGRAM, AND STORAGE MEDIUM

(75) Inventor: Hiroyuki Shinbata, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/167,700

(22) Filed: Jun. 13, 2002

(65) Prior Publication Data

US 2002/0196907 A1 Dec. 26, 2002

(30) Foreign Application Priority Data

Jun. 19, 2001 (JP) ........................................ 2001-185456
May 14, 2002 (JP) ........................................ 2002-138875

(51) Int. Cl.$^7$ ............................................ G01N 23/083
(52) U.S. Cl. ........................ 378/62; 382/130; 382/131; 378/8
(58) Field of Search ............................ 378/4, 8, 19, 62; 382/130, 131

(56) References Cited

U.S. PATENT DOCUMENTS

| 5,467,404 | A | | 11/1995 | Vuylsteke et al. | ........... 382/274 |
| 5,644,662 | A | | 7/1997 | Vuylsteke | ................... 382/302 |
| 5,805,721 | A | | 9/1998 | Vuylsteke et al. | ........... 382/128 |
| 5,960,123 | A | | 9/1999 | Ito | ............................. 382/274 |
| 5,991,457 | A | | 11/1999 | Ito et al. | ..................... 382/254 |
| 6,009,208 | A | * | 12/1999 | Mitra et al. | ................. 382/254 |
| 6,072,913 | A | | 6/2000 | Yamada | ....................... 382/275 |
| 2001/0016066 | A1 | * | 8/2001 | Amonou | ...................... 382/173 |
| 2002/0031247 | A1 | * | 3/2002 | Matsuura et al. | ............ 382/132 |
| 2002/0159623 | A1 | * | 10/2002 | Shinbata | ..................... 382/128 |
| 2002/0168109 | A1 | * | 11/2002 | Shinbata | ..................... 382/191 |
| 2003/0016855 | A1 | * | 1/2003 | Shinbata | ..................... 382/132 |

FOREIGN PATENT DOCUMENTS

| EP | 0 996 090 A2 | 4/2000 | ............. G06T/5/20 |
| JP | 10-272283 | 9/1998 | .......... H04N/1/407 |
| JP | 2000-101841 A | 4/2000 | .......... H04N/1/407 |

OTHER PUBLICATIONS

Andrew Laine, Walter Huda, "Enhancement By Multiscale Nonlinear Operators", Handbook Of Medical Imaging Processing And Analysis, Ch. 3, 2000, pp. 33–55, XP002255543, Acad mic Press.

Yang Yan, et al. "Contrast Enhancement Of Radiographs Using Shift Invariant Wavelet Transform"; Wuhan University Journal of Natural Sciences, Mar. 2000, Ed. Dept. Wuhan Univ., China, vol. 5, No. 1; pp. 59–62, XP008021591 ISSN, 1007–1202.

\* cited by examiner

*Primary Examiner*—David V Bruce
(74) *Attorney, Agent, or Firm*—Fitzpatrick, Cella, Harper & Scinto

(57) ABSTRACT

An image processing apparatus for executing a plurality of image processings for an objective image, includes a decomposition unit for decomposing the objective image into components of a plurality of frequency bands, an analysis unit for analyzing the components obtained by the decomposition unit with respect to each of the plurality of image processings, a component conversion unit for converting the components obtained by the decomposition unit on the basis of the analysis results of the analysis unit, and an image generation unit for generating an image, after the objective image has undergone the plurality of image processings, from the components of the plurality of frequency bands converted by the component conversion unit.

79 Claims, 26 Drawing Sheets

IMAGE PROCESSING APPARATUS, IMAGE PROCESSING SYSTEM, IMAGE PROCESSING METHOD, PROGRAM, AND STORAGE MEDIUM

FIELD OF THE INVENTION

The present invention relates to an image processing apparatus, image processing system, and image processing method, a program, and a computer readable storage medium that stores the program, for executing an image processing for an objective image.

BACKGROUND OF THE INVENTION

Conventionally, for example, a chest image obtained by X-ray photography has a very broad range of pixel values since it is made up of an image region of lungs which readily transmit X-rays, and an image region of a mediastinal part which hardly transmit X-rays. For this reason, it has been considered to be difficult to obtain a visualized X-ray chest image that allows to simultaneously observe image portions of both the lungs and mediastinal part.

As a method of avoiding this problem, an image processing method described in Japanese Patent Laid-Open No. 2000-101841 or the like is known. This image processing method is described using an original image f(x, y), an image fh(x, y) after tone conversion of the original image f(x, y), an image fc(x, y) after compression of the original image f(x, y), a low-frequency image (smoothed image) Sus(x, y) of the original image f(x, y), and a constant B by:

$$fc(x, y) = F(f(x, y)) + B \times \left(1 - \frac{\partial F(f(x, y))}{\partial f(x, y)}\right) \times (f(x, y) - Sus(x, y)) \quad (1)$$

$$Sus(x, y) = \frac{\int_{-d1}^{d1}\int_{-d2}^{d2} f(x+x1, y+y1)\,dx1\,dy1}{\int_{-d1}^{d1}\int_{-d2}^{d2} dx1\,dy1} \quad (2)$$

In equation (1), f(x, y)−Sus(x, y)

represents high-frequency components. By the effect of the second term of equation (1) including this part, the amplitudes of the compressed high-frequency components are restored or reconstructed (when B=1) and, hence, the appearance of a microstructure mainly formed by the high-frequency components can be maintained as in the original image f(x, y) even after compression of the dynamic range.

Note that "F( )" is a monotone increasing function indicating a tone conversion curve. The tone conversion function F( ) is defined to be continuous and differentiable. With this method, the dynamic range of image data can be compressed while maintaining the amplitudes of high-frequency components (when B=1).

Note that the low-frequency image "Sus(x, y)" given by equation (2) is a moving average image of the original image f(x, y).

As an image process for making the microstructure easy to see, a so-called sharpening process is known. This sharpening process is described using the original image f(x, y), a processed image fp(x, y), a low-frequency image Sus2(x, y) of the original image f(x, y), and a constant C by:

$$fp(x, y) = f(x, y) + C \times (f(x, y) - Sus2(x, y)) \quad (3)$$

Note that the low-frequency image Sus2(x, y) has a mask size different from the low-frequency image Sus(x, y) given by equation (2).

As another image process, a noise removal process for reducing noise by removing or suppressing predetermined high-frequency components have been examined.

However, with the conventional image processing method, all of a plurality of image processes such as the aforementioned dynamic range compression process, sharpening process, noise removal process, and the like cannot be satisfactorily done for an original image.

More specifically, when the original image f(x, y) undergoes the sharpening process, and then the dynamic range compression process, equation (1) is rewritten as:

$$fc(x, y) = F(fp(x, y)) + B \times \left(1 - \frac{\partial F(f(x, y))}{\partial f(x, y)}\right) \times (fp(x, y) - Sus3(x, y)) \quad (4)$$

In this equation (4), fp(x, y)−Sus3(x, y)

represents the high-frequency components of the image fp(x, y) after the sharpening process.

However, the low-frequency image Sus3(x, y) of the image fp(x, y) after the sharpening process is influenced by the term including "Sus4(x, y)", as described by:

$$Sus3(x, y) = \frac{\int_{-d1}^{d1}\int_{-d2}^{d2} fp(x+x1, y+y1)\,dx1\,dy1}{\int_{-d1}^{d1}\int_{-d2}^{d2} dx1\,dy1} \quad (5)$$

$$= (1+c) \times Sus(x, y) - c \times Sus4(x, y)$$

$$Sus4(x, y) = \frac{\int_{-d1}^{d1}\int_{-d2}^{d2} sus2(x+x1, y+y1)\,dx1\,dy1}{\int_{-d1}^{d1}\int_{-d2}^{d2} dx1\,dy1} \quad (6)$$

and is different from high-frequency components given by:

f(x, y)−Sus(x, y)

in equation (1), and high-frequency components given by:

fp(x, y)−Sus3(x, y)

in equation (4).

Therefore, the dynamic range compression process described by equation (1), and that described by equation (4) have different high-frequency bands to be restored and different restorabilities of the microstructure, and such differences may deteriorate image quality. The same problem is experienced when the sharpening process is done after the dynamic range compression process.

That is, when a frequency process using a low-frequency image obtained by calculating a moving average or the like is done twice or more, the same problem is posed irrespective of what sharpening and dynamic range compression processes are used. Since the visible characteristics of a human being for high-frequency components change depending on the density (luminance) level, and the dynamic range compression process changes the density (pixel value) level of at least a partial region of an image, the effect of the sharpening process is influenced by the dynamic range compression process.

The noise removal process basically suppresses high-frequency components, while the sharpening process emphasizes high-frequency components. That is, the noise removal process and sharpening process have conflicting effects.

Therefore, in a conventional arrangement in which the noise removal process and sharpening process are independently done, a region where high-frequency components are to be suppressed may be emphasized, or a region where high-frequency components are to be emphasized may be suppressed. Such problem directly leads to deterioration of image quality.

Also, the sharpening process described by equation (3) cannot emphasize a specific frequency band (e.g., one or a plurality of predetermined middle frequency bands). Hence, an image process such as a sharpening process may be executed using a multiple-frequency process that can easily adjust (emphasize and/or suppress) the specific frequency band). In this case as well, the same problem as described above remains unsolved upon executing a plurality of different image processes such as a process for changing the dynamic range, sharpening process, and the like.

For example, a plurality of different image processes such as a dynamic range change process, sharpening process, and the like must be appropriately mixed to assure restorability of image components in a specific frequency band or allow an easy frequency emphasis or suppression process that the user intended.

SUMMARY OF THE INVENTION

The present invention has been made to solve the above problems, and has as its object to provide an image processing apparatus, image processing system, and image processing method, a program, and a computer readable storage medium that stores the program, which can systematically, efficiently, and appropriately execute a plurality of image processings.

It is another object of the present invention to provide an image processing apparatus, image processing system, and image processing method, a program, and a computer readable storage medium that stores the program, which can obtain a stable image processing effect.

In order to achieve the above objects, an image processing apparatus according to the present invention comprises the following arrangement. That is, there is provided an image processing apparatus for executing a plurality of image processes for an objective image, comprising:

a decomposition unit for decomposing the objective image into components of a plurality of frequency bands;

an analysis unit for analyzing the components obtained by the decomposition unit with respect to each of the plurality of image processings;

a component conversion unit for converting the components obtained by the decomposition unit on the basis of analysis results of the analysis unit; and an image generation unit for generating an image, after the objective image has undergone the plurality of image processings, from the components of the plurality of frequency bands converted by the component conversion unit.

Preferably, the plurality of image processes include at least two of a noise removal process, sharpening process, and dynamic range change process.

Preferably, the objective image includes an image taken by radiography.

In order to achieve the above objects, an image processing apparatus according to the present invention comprises the following arrangement. That is, there is provided an image processing apparatus for executing a plurality of image processings for an objective image, comprising:

a decomposition unit for decomposing the objective image into components of a plurality of frequency bands;

an analysis unit for analyzing the components obtained by the decomposition unit with respect to each of the plurality of image processings on the basis of information of a pixel value level of a visible image obtained via the plurality of image processings for the objective image;

a component conversion unit for converting the components obtained by the decomposition unit on the basis of analysis results of the analysis unit; and an image generation unit for generating an image, after the objective image has undergone the plurality of image processings, from the components of the plurality of frequency bands converted by the component conversion unit.

Preferably, the plurality of image processes include at least two of a noise removal process, sharpening process, and dynamic range change process.

Preferably, the objective image includes an image taken by radiography.

Preferably, the apparatus further comprises tone conversion unit for converting an input pixel value into a pixel value of the visible image, and the component conversion unit converts the components obtained by the decomposition unit on the basis of tone conversion characteristics of the tone conversion unit.

Preferably, the component conversion unit converts the components obtained by the decomposition unit on the basis of the tone conversion characteristics and pattern information which specifies a relationship between the pixel value level and component conversion characteristics of the component conversion unit.

Preferably, the component conversion unit is noise removal means, and the component conversion unit changes a cutoff width of a coefficient conversion curve for noise removal on the basis of the information of the pixel value level.

Preferably, the objective image is an image taken by radiography of an object, and the pattern information is determined based on at least one information of a portion to be radiographed of the object and a condition of the radiography.

Preferably, the apparatus further comprises change unit for changing the tone conversion characteristics.

In order to achieve the above objects, an image processing apparatus according to the present invention comprises the following arrangement. That is, there is provided an image processing apparatus for executing an image process for an objective image, comprising:

a decomposition unit for decomposing the objective image into components of a plurality of frequency bands;

a component conversion unit for converting the components obtained by the decomposition unit on the basis of information of a pixel value level of a visible image obtained via the image processing for the objective image; and an image generation unit for generating an image, after the objective image has undergone the image processings, from the components of the plurality of frequency bands converted by the component conversion unit.

Preferably, the apparatus further comprises a tone conversion unit for converting an input pixel value into a pixel value of the visible image, and the component conversion unit converts the components obtained by the decomposition unit on the basis of tone conversion characteristics of the tone conversion unit.

Preferably, the component conversion unit converts the components obtained by the decomposition unit on the basis of the tone conversion characteristics and pattern information which specifies a relationship between the pixel value level and component conversion characteristics of the component conversion unit.

Preferably, the component conversion unit has a noise removal function, and the component conversion unit changes a cutoff width of a coefficient conversion curve for noise removal on the basis of the information of the pixel value level.

Preferably, the objective image is an image taken by radiography of an object, and the pattern information is determined based on at least one information of a portion to be radiographed of the object and a condition of the radiography.

Preferably, the apparatus further comprises a change unit for changing the tone conversion characteristics.

In order to achieve the above objects, an image processing system according to the present invention comprises the following arrangement. That is, there is provided an image processing system formed by connecting a plurality of apparatuses intercommunicatably for executing a plurality of image processings for an objective image, comprising:

a decomposition unit for decomposing the objective image into components of a plurality of frequency bands;

an analysis unit for analyzing the components obtained by the decomposition unit with respect to each of the plurality of image processings;

a component conversion unit for converting the components obtained by the decomposition unit on the basis of analysis results of the analysis unit; and an image generation unit for generating an image, after the objective image has undergone the plurality of image processings, from the components of the plurality of frequency bands converted by the component conversion unit.

In order to achieve the above objects, an image processing system according to the present invention comprises the following arrangement. That is, there is provided an image processing system formed by connecting a plurality of apparatuses intercommunicatably for executing a plurality of image processings for an objective image, comprising:

a decomposition unit for decomposing the objective image into components of a plurality of frequency bands;

an analysis unit for analyzing the components obtained by the decomposition unit with respect to each of the plurality of image processings on the basis of information of a pixel value level of a visible image obtained via the plurality of image processings for the objective image;

a component conversion unit for converting the components obtained by the decomposition unit on the basis of analysis results of the analysis unit; and an image generation unit for generating an image, after the objective image has undergone the plurality of image processings, from the components of the plurality of frequency bands converted by the component conversion unit.

In order to achieve the above objects, an image processing system according to the present invention comprises the following arrangement. That is, there is provided an image processing system formed by connecting a plurality of apparatuses intercommunicatably for executing an image processings for an objective image, comprising:

a decomposition unit for decomposing the objective image into components of a plurality of frequency bands;

a component conversion unit for converting the components obtained by the decomposition unit on the basis of information of a pixel value level of a visible image obtained via the image processing for the objective image; and an image generation unit for generating an image, after the objective image has undergone the image processings, from the components of the plurality of frequency bands converted by the component conversion unit.

In order to achieve the above objects, a program according to the present invention comprises the following arrangement. That is, there is provided a program for making a computer function as an image processing apparatus for executing a plurality of image processing for an objective image, the image processing apparatus comprising:

a decomposition unit for decomposing the objective image into components of a plurality of frequency bands;

an analysis unit for analyzing the components obtained by the decomposition unit with respect to each of a plurality of image processes;

a component conversion unit for converting the components obtained by the decomposition unit on the basis of analysis results of the analysis unit; and an image generation unit for generating an image, after the objective image has undergone the plurality of image processings, from the components of the plurality of frequency bands converted by the component conversion unit.

In order to achieve the above objects, a program according to the present invention comprises the following arrangement. That is, there is provided a program for making a computer function as an image processing apparatus for executing a plurality of image processing for an objective image, the image processing apparatus comprising:

a decomposition unit for decomposing the objective image into components of a plurality of frequency bands;

an analysis unit for analyzing the components obtained by the decomposition unit with respect to each of the plurality of image processings on the basis of information of a pixel value level of a visible image obtained via the plurality of image processings for the objective image;

a component conversion unit for converting the components obtained by the decomposition unit on the basis of analysis results of the analysis unit; and an image generation unit for generating an image, after the objective image has undergone the plurality of image processings, from the components of the plurality of frequency bands converted by the component conversion unit.

In order to achieve the above objects, a program according to the present invention comprises the following arrangement. That is, there is provided a program for making a computer function as an image processing apparatus for executing an image processing for an objective image, the image processing apparatus comprising:

a decomposition unit for decomposing the objective image into components of a plurality of frequency bands;

a component conversion unit for converting the components obtained by the decomposition unit on the basis of information of a pixel value level of a visible image obtained via the image processing for the objective image; and an image generation unit for generating an image, after the objective image has undergone the plurality of image processings, from the components of the plurality of frequency bands converted by the component conversion unit.

In order to achieve the above objects, a computer readable medium according to the present invention comprises the following arrangement. That is, there is provided a computer readable storage medium which stores a program for making a computer function as an image processing apparatus for executing an image processing for an objective image, the image processing apparatus comprising:

a decomposition unit for decomposing the objective image into components of a plurality of frequency bands;

an analysis unit for analyzing the components obtained by the decomposition unit with respect to each of the plurality of image processings;

a component conversion unit for converting the components obtained by the decomposition unit on the basis of analysis results of the analysis unit; and an image generation unit for generating an image, after the objective image has undergone the plurality of image processings, from the components of the plurality of frequency bands converted by the component conversion unit.

In order to achieve the above objects, a computer readable medium according to the present invention comprises the following arrangement. That is, there is provided a computer readable storage medium which stores a program for making a computer function as an image processing apparatus for executing a plurality of image processings for an objective image, the image processing apparatus comprising:

a decomposition unit for decomposing the objective image into components of a plurality of frequency bands;

an analysis unit for analyzing the components obtained by the decomposition unit with respect to each of the plurality of image processings on the basis of information of a pixel value level of a visible image obtained via the plurality of image processings for the objective image;

a component conversion unit for converting the components obtained by the decomposition unit on the basis of analysis results of the analysis unit; and an image generation unit for generating an image, after the objective image has undergone the plurality of image processings, from the components of the plurality of frequency bands converted by the component conversion unit.

In order to achieve the above objects, a computer readable medium according to the present invention comprises the following arrangement. That is, there is provided a computer readable storage medium which stores a program for making a computer function as an image processing apparatus for executing an image processing for an objective image, the image processing apparatus comprising:

a decomposition unit for decomposing the objective image into components of a plurality of frequency bands;

a component conversion unit for converting the components obtained by the decomposition unit on the basis of information of a pixel value level of a visible image obtained via the image processing for the objective image; and an image generation unit for generating an image, after the objective image has undergone the plurality of image processings, from the components of the plurality of frequency bands converted by the component conversion unit.

In order to achieve the above objects, an image processing method according to the present invention comprises the following arrangement. That is, there is provided an image processing method of executing a plurality of image processings for an objective image, comprising:

the decomposition step of decomposing the objective image into components of a plurality of frequency bands;

the analysis step of analyzing the components obtained in the decomposition step with respect to each of the plurality of image processings;

the component conversion step of converting the components obtained in the decomposition step on the basis of analysis results of the analysis step; and the image generation step of generating an image, after the objective image has undergone the plurality of image processings, from the components of the plurality of frequency bands converted in the component conversion step.

In order to achieve the above objects, an image processing method according to the present invention comprises the following arrangement. That is, there is provided an image processing method of executing a plurality of image processings for an objective image, comprising:

the decomposition step of decomposing the objective image into components of a plurality of frequency bands;

the analysis step of analyzing the components obtained in the decomposition step with respect to each of the plurality of image processings on the basis of information of a pixel value level of a visible image obtained via the plurality of image processings for the objective image;

the component conversion step of converting the components obtained in the decomposition step on the basis of analysis results of the analysis step; and the image generation step of generating an image, after the objective image has undergone the plurality of image processings, from the components of the plurality of frequency bands converted in the component conversion step.

In order to achieve the above objects, an image processing method according to the present invention comprises the following arrangement. That is, there is provided an image processing method of executing an image processing for an objective image, comprising:

the decomposition step of decomposing the objective image into components of a plurality of frequency bands;

the component conversion step of converting the components obtained in the decomposition step on the basis of information of a pixel value level of a visible image obtained via the image processing for the objective image; and the image generation step of generating an image, after the objective image has undergone the plurality of image processings, from the components of the plurality of frequency bands converted in the component conversion step.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Preferred embodiments of the present invention will be described hereinafter with reference to the accompanying drawings.

<First Embodiment>

Figure 1:
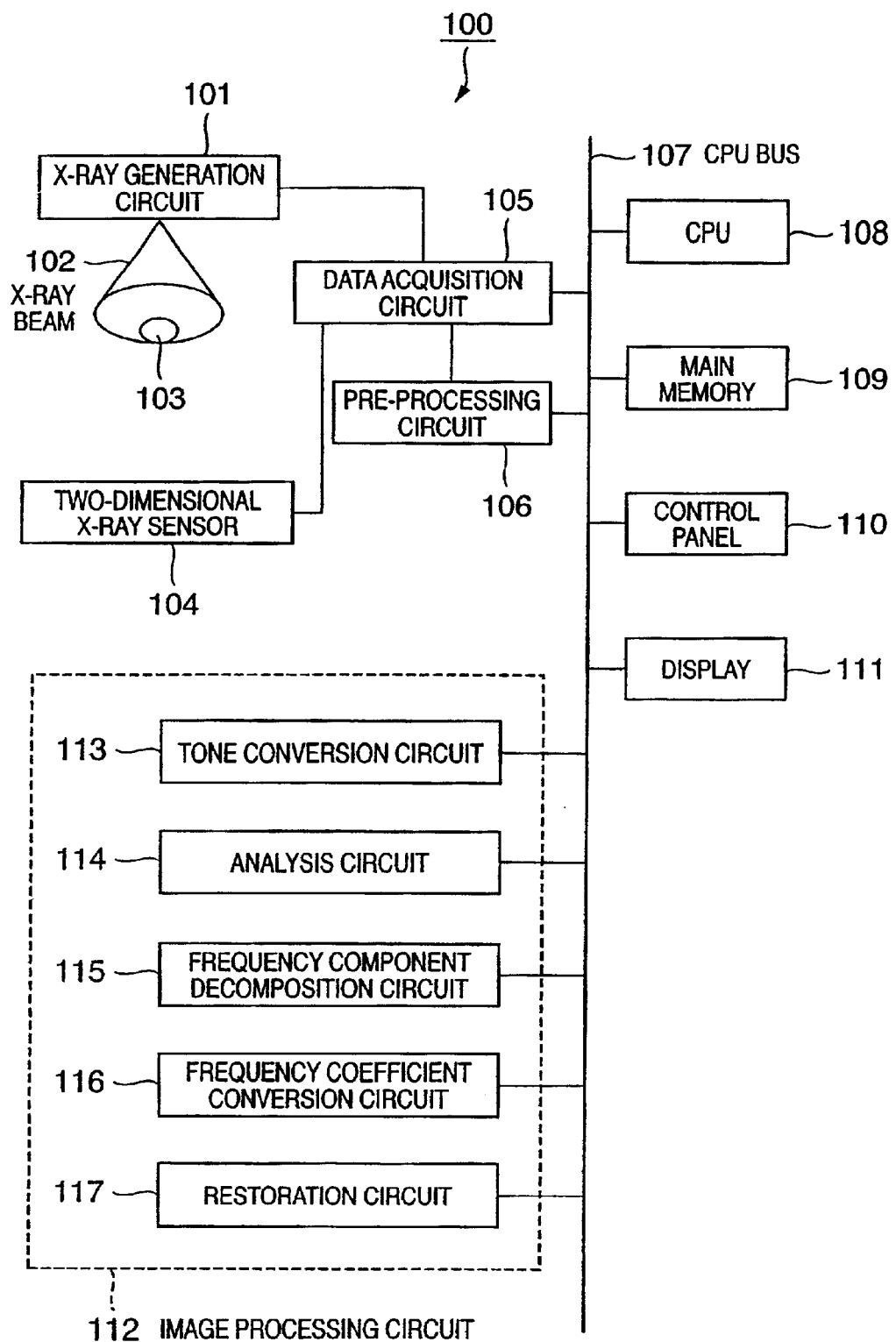
FIG. 1 is a block diagram showing the arrangement of an X-ray photography apparatus according to the first embodiment of the present invention.

The present invention is applied to, e.g., an X-ray photography apparatus 100, as shown in FIG. 1.

As shown in FIG. 1, the X-ray photography apparatus 100 of the first embodiment comprises an X-ray generation circuit 101 for generating an X-ray beam 102, a two-dimensional X-ray sensor 104 for detecting the X-ray beam 102 which has been transmitted through an object 103, a data acquisition circuit 105 for acquiring image data output from the two-dimensional X-ray sensor 104, a pre-processing circuit 106 for executing a pre-process of the image data acquired by the data acquisition circuit 105, a main memory 109 for storing various kinds of information such as an image (processed image) that has undergone the process of the pre-processing circuit 106 and the like, and processing programs used to execute various processes, a control panel 110 used to make instructions such as an X-ray photography execution instruction and the like, and various setups with respect to the apparatus 100, an image processing circuit 112 for executing a plurality of image processes of the processed image (original image) of the pre-processing circuit 106, a display 111 for displaying a processed image and the like of the image processing circuit 112, and a CPU 108 for controlling the operation of the overall apparatus 100.

The data acquisition circuit 105, pre-processing circuit 106, display 111, image processing circuit 112, CPU 108, main memory 109, and control panel 110 are connected via a CPU bus 107 to be able to communicate with each other.

The image processing circuit 112 comprises a tone conversion circuit 113, analysis circuit 114, frequency component decomposition circuit 115, frequency coefficient conversion circuit 116, and restoration circuit 117.

The analysis circuit 114 makes analysis for a noise removal process, analysis upon executing a sharpening process, analysis upon changing the dynamic range, and the like. Note that "change" means compression and/or expansion, and "analysis" means to determine frequency coefficients (frequency components) after they have been changed by respective processes or the degree of change, and a region (position) of the frequency coefficients to be changed.

The frequency component decomposition circuit 115 executes a discrete wavelet transformation process (to be also referred to as "DWT process" hereinafter) of an original image to acquire frequency coefficients (wavelet transform coefficients) for respective frequency bands.

The frequency coefficient conversion circuit 116 executes a conversion process of the frequency coefficients for respective frequency bands decomposed by the frequency component decomposition circuit 115 on the basis of the analysis result of the analysis circuit 114.

The restoration circuit 117 executes an inverse discrete wavelet transformation process (to be also referred to as "inverse DWT process" hereinafter) of the frequency coefficients after the conversion process of the frequency coefficient conversion circuit 116 to generate an image that has undergone the image process.

In the first embodiment, the DWT process is used as a process for decomposing an image into components of a plurality of frequency bands. However, the present invention is not limited to such specific process. For example, a Laplacian pyramid method, a process using a filter or the like without any subband transformation (e.g., a method using a plurality of different smoothing filters with different mask sizes), and the like may be applied.

Also, the "tone conversion circuit 113" in FIG. 1 is required in the second embodiment to be described later, and a description thereof will be omitted here.

Figure 2:
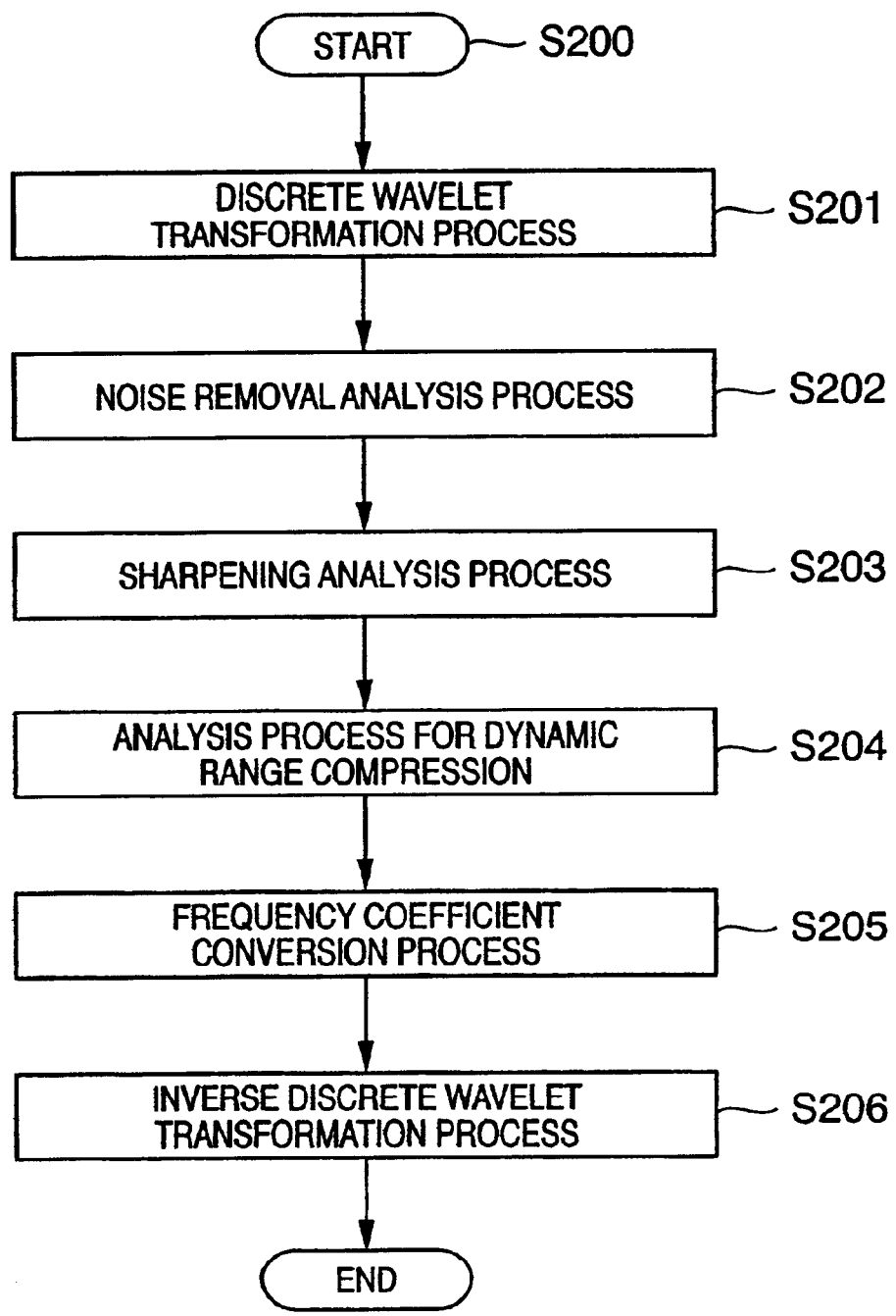
FIG. 2 is a flow chart for explaining the operation of the X-ray photography apparatus according to the first embodiment of the present invention.

FIG. 2 is a flow chart showing the operation of the X-ray photography apparatus according to the first embodiment of the present invention.

Upon executing the operation according to the flow chart shown in FIG. 2, for example, the main memory 109 stores data, processing programs, and the like, which are required when the CPU 108 executes various processes, and is also used as a work memory of the CPU 108. Especially, the main memory 109 stores a processing program according to the flow chart shown in FIG. 2 as a processing program for a plurality of image processes.

Therefore, the CPU 108 makes control for the operation of the X-ray photography apparatus 100 to be described below in accordance with operations at the console panel 110 by reading out and executing the processing program for the plurality of image processes (the processing program according to the flow chart of FIG. 2) from the main memory 109.

Step S200:

The X-ray generation circuit 101 emits the X-ray beam 102 toward the object (object to be examined) 103.

The X-ray beam 102 emitted by the X-ray generation circuit 101 is transmitted through the object 103 to be examined while being attenuated, and reaches the two-dimensional X-ray sensor 104. The two-dimensional X-ray sensor 104 detects the intensity distribution of X-rays that have reached the sensor 104, and outputs image data corresponding to the intensity distribution as an X-ray image. Assume that the X-ray image is, for example, an image of a predetermined portion of a human body such as a chest image or the like.

The data acquisition circuit 105 converts the X-ray image data output from the two-dimensional X-ray sensor 104 into digital image data of a predetermined format, and supplies it to the pre-processing circuit 106.

The pre-processing circuit 106 executes pre-processes such as an offset correction process, gain correction process, and the like for X-ray image data from the data acquisition circuit 105.

The X-ray image data that has undergone the pre-processes by the pre-processing circuit 106 is transferred as information of an input image (original image) to the main memory 109, display 11, and image processing circuit 112 via the CPU bus 107 under the control of the CPU 108.

Step S201:

In the image processing circuit 112, the frequency component decomposition circuit 115 executes a two-dimensional discrete wavelet transformation process (DWT process) of an original image f(x, y) to acquire frequency coefficients for respective frequency bands.

Figure 3A:
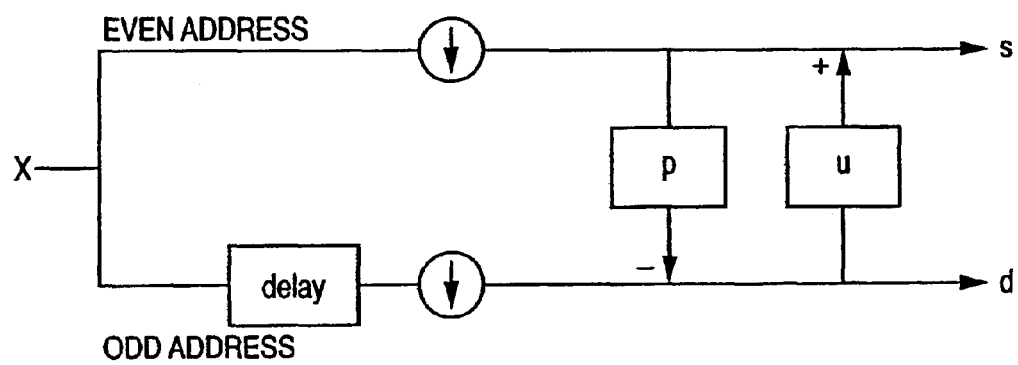
FIG. 3A is a diagram for explaining the arrangement of a frequency component decomposition circuit of the X-ray photography apparatus according to the first embodiment of the present invention.

More specifically, for example, FIG. 3A shows the arrangement of a linear discrete wavelet transformation process. In this arrangement, the original image f(x, y) is separated into odd and even address signals by a combination of a delay element (delay) and down samplers, and these signals undergo filter processes using two filters p and u.

Signals s and d after the filter processes represent low- and high-pass coefficients upon decomposing a linear image signal to one level, and are respectively computed by:

$$d(n)=x(2*n+1)-\text{floor}((x(2*n)+x(2*n+2))/2) \qquad (7)$$

$$s(n)=x(2*n)+\text{floor}((d(n-1)+d(n))/4) \qquad (8)$$

where x(n) is an image signal to be transformed.

The frequency component decomposition circuit 115 sequentially executes the aforementioned linear discrete wavelet transformation process in the horizontal and vertical directions of the original image f(x, y) to attain a two-dimensional discrete wavelet transformation process of one level. Since details of two-dimensional discrete wavelet transformation are known to those who are skilled in the art, a detailed description thereof will be omitted.

Figure 3B:
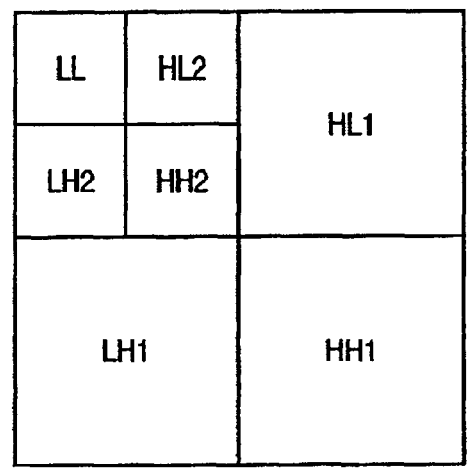
FIG. 3B is a view for explaining the arrangement of the frequency component decomposition circuit of the X-ray photography apparatus according to the first embodiment of the present invention.

FIG. 3B shows an example of transform coefficient groups of two levels obtained by the two-dimensional discrete wavelet transformation process in the frequency component decomposition circuit 115.

As shown in FIG. 3B, an image signal is decomposed into coefficients HH1, HL1, LH1, . . . , LL and the like (HH1 and the like will be also referred to as "subbands" hereinafter) of different frequency bands.

Figure 4:
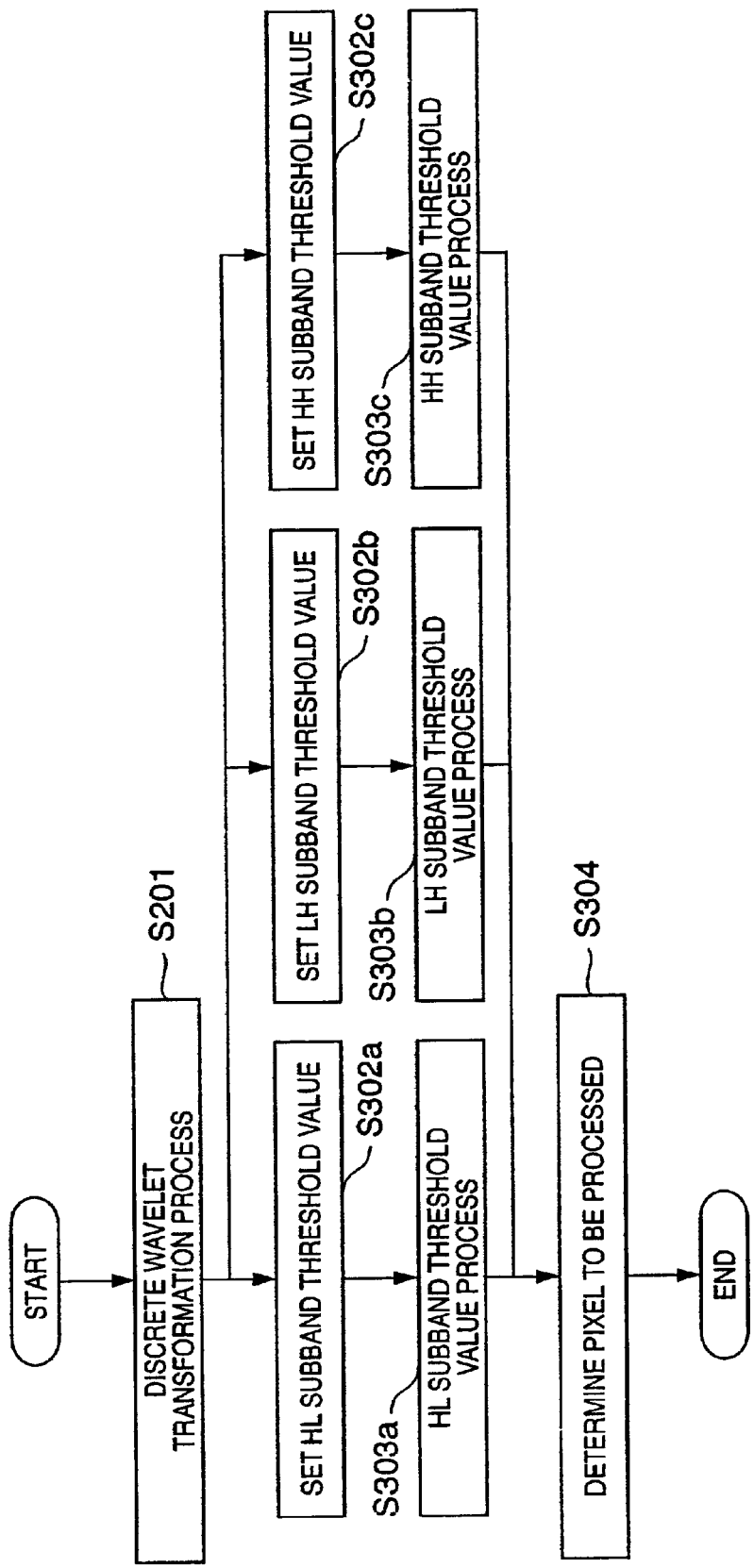
FIG. 4 is a flow chart for explaining the operation of an analysis circuit of the X-ray photography apparatus according to the first embodiment of the present invention.

Step S202:

The analysis circuit 114 executes a process shown in FIG. 4.

More specifically, the analysis circuit 114 sets an arbitrary threshold value for each of three subbands, i.e., high-frequency coefficients HL, LH, and HH, of those obtained by the frequency component decomposition circuit 115 (step S201) (steps S302a to S302c).

As the threshold value setting method, an arbitrary method may be used. For example, a method of setting a constant which is obtained by experiences in accordance with the decomposition level of discrete wavelet transformation, a method of automatically determining a threshold value on the basis of a statistical value such as an average value, variance, or the like of each subband, and the like may be used.

The analysis circuit 114 executes a threshold value process for high-frequency coefficients HL, LH, and HH on the basis of the set threshold values (steps S303a to S303c). More specifically, for example, a binarization process described by:

if $(-TH_{HL}<HL(x, y)<TH_{HL})$ then binary image $HL(x, y)=1$;

else binary image $HL(x, y)=0$;

if $(-TH_{LH}<LH(x, y)<TH_{LH})$ then binary image $LH(x, y)=1$;

else binary image $LH(x, y)=0$;

if $(-TH_{HH}<HH(x, y)<TH_{HH})$ then binary image $HH(x, y)=1$;

else binary image $HH(x, y)=0$; \qquad (9)

may be executed as the threshold value process.

In formulas (9), "$TH_{HL}$", "$TH_{LH}$", and "$TH_{HH}$" represent the threshold values respectively set for subbands HL, LH, and HH, and "HL(x, y)", "LH(x, y)", and "HH(x, y)" respectively represent the pixel values of the subbands, i.e., wavelet coefficients. Also, "binary image HL(x, y)", "binary image LH(x, y)", and "binary image HH(x, y)" are images after subbands HL(x, y), LH(x, y), and HH(x, y) are binarized based on their pixel values (coefficients).

The analysis circuit 114 determines a pixel to be processed (objective coefficient) in the frequency coefficient conversion circuit 116 on the basis of the aforementioned threshold value process (step S304).

As a method of determining the pixel to be processed, an arbitrary method may be used. For example, a method using the AND of binary images of respective subbands may be used. This method is described by:

if ((binary image $HL(x, y)=1$) AND (binary image $LH(x, y)=1$) AND (binary image $HH(x, y)=1$))

then binary image $HL(x, y)$=binary image $LH(x, y)$=binary image $HH(x, y)=1$;

else binary image $HL(x, y)$=binary image $LH(x, y)$=binary image $HH(x, y)=0$;  (10)

Note that pixels (coefficient) of respective subbands corresponding to pixels with a pixel value "1" in the binary images of respective subbands are determined to be the pixels to be processed (objective coefficients).

The analysis circuit 114 saves in the main memory 109 information (binary images of respective subbands) that pertains to the pixels to be processed, which are determined using formula (10). At this time, the analysis circuit 114 calculates the average value of a coefficient and those within a predetermined region around that coefficient for each of the coefficients of the subbands corresponding to pixels with a pixel value "1" in the binary images of the respective subbands, and also saves the calculated coefficient values and positions (coordinates) in the main memory 109.

Step S203:

The analysis circuit 114 makes analysis for coefficient conversion for a sharpening process.

Figure 5:
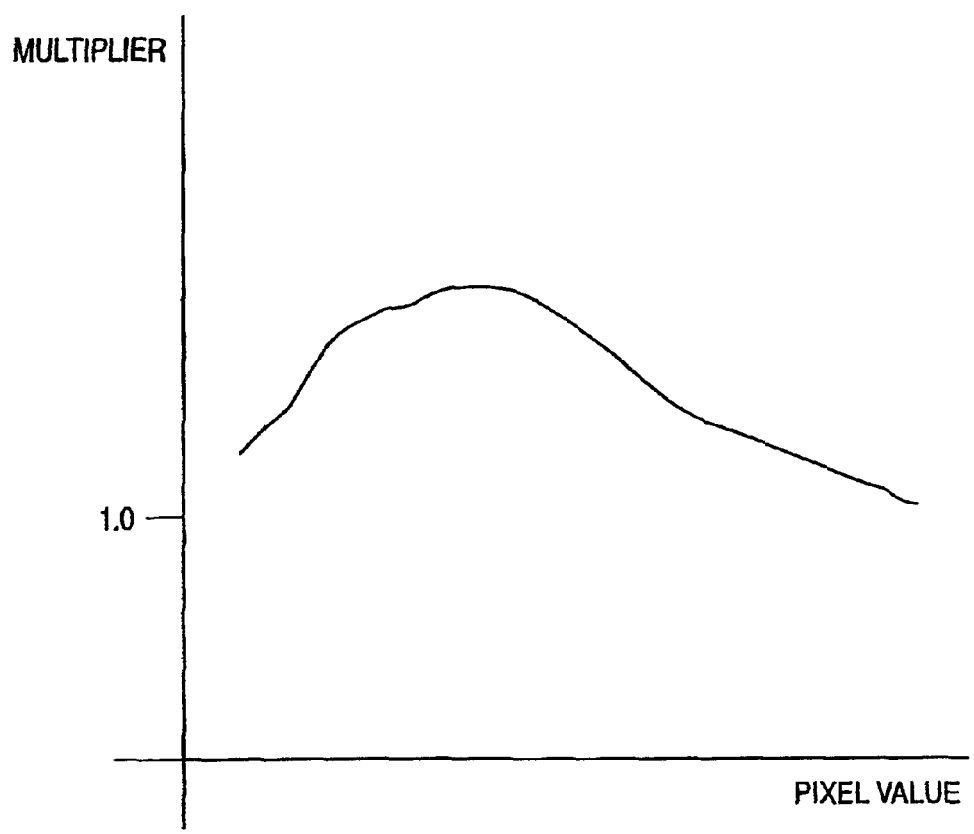
FIG. 5 is a graph for explaining a process for analyzing the degree of conversion of coefficients for a sharpening process in the analysis circuit according to the first embodiment of the present invention.

More specifically, for example, the analysis circuit 114 analyzes the frequency coefficients (high-frequency coefficients) of subbands HL, LH, and HH (to determine, e.g., multipliers for these frequency coefficients) on the basis of data indicating the degree of change in high-frequency coefficient in accordance with a pixel value of the original image, e.g., a conversion function used to change a high-frequency coefficient in accordance with the pixel value of the original image, as shown in FIG. 5 (for example, a function indicating a multiplier to be multiplied by the frequency coefficient in accordance with the pixel value of the original image, i.e., the ratio of coefficient values before and after change), or the like, and saves the analysis result in the main memory 109.

In the first embodiment, one conversion function shown in FIG. 5 is used for all subbands HL, LH, and HH for the sake of simplicity. However, the present invention is not limited to this, and different conversion functions may be used for respective subbands.

Step S204:

The analysis circuit 114 analyzes a degree of change in coefficient corresponding to the lowest-frequency band (subband LL) in accordance with the value of that coefficient so as to change the dynamic range of the image, and saves the analysis result in the main memory 109.

Figure 6:
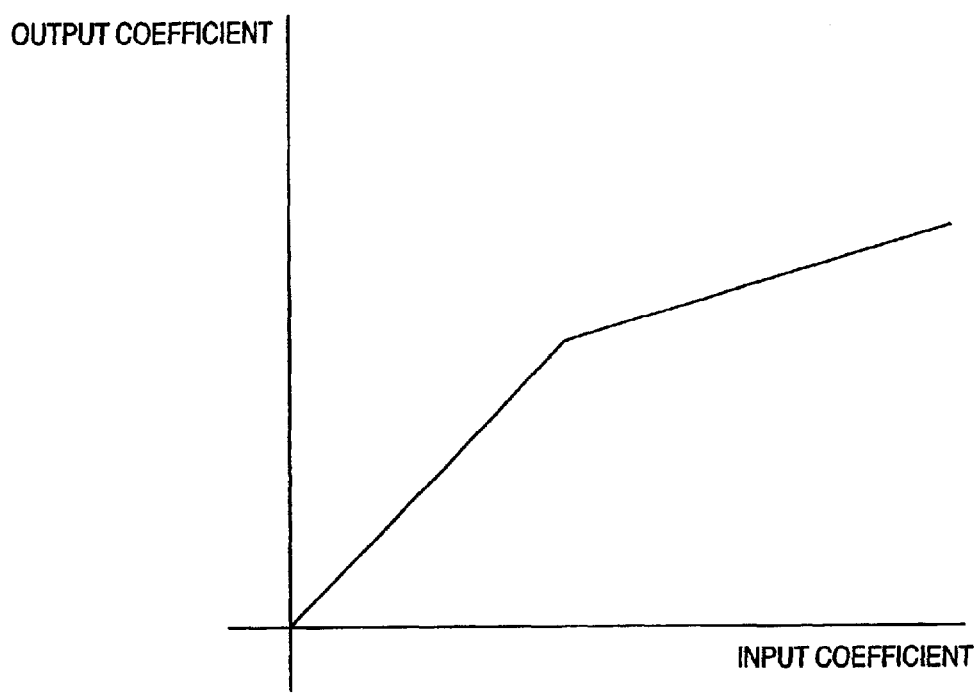
FIG. 6 is a graph for explaining a process for analyzing the degree of conversion of coefficients for a dynamic range change process in the analysis circuit according to the first embodiment of the present invention.

More specifically, for example, the analysis circuit 114 analyzes respective frequency coefficients of subband LL (to determine, e.g., multipliers for these frequency coefficients) on the basis of data indicating the degree of change in coefficient in accordance with that coefficient of subband LL, e.g., a conversion function used to change a given coefficient in accordance with that coefficient of subband LL, as shown in FIG. 6, (for example, a function indicating a multiplier to be multiplied by a given coefficient in accordance with the value of that coefficient, i.e., the ratio of coefficient values before and after change) or the like, and saves that analysis result in the main memory 109. In general, since the values of coefficients of the lowest-frequency band have high correlation with pixel values of an original image, the dynamic range of a restored image can be changed by changing the values of the coefficients of the lowest-frequency band.

Step S205:

The frequency coefficient conversion circuit 116 converts the coefficients for respective frequency bands obtained by the frequency component decomposition circuit 115 in step S201 on the basis of the information saved in the main memory 109 in steps S202 to S204.

More specifically, the frequency coefficient conversion circuit 116 replaces the coefficients obtained by the frequency component decomposition circuit 115 by those, which are obtained by noise removal analysis and are saved in the main memory 109. After that, the frequency coefficient conversion circuit 116 changes the coefficients on the basis of the degrees of change (e.g., multipliers), which are obtained by sharpening analysis and saved in the main memory 109. Furthermore, the frequency coefficient conversion circuit 116 changes the coefficients of the lowest-frequency band (subband LL) on the basis of the degrees of change (e.g., multipliers), which are obtained by the dynamic range change analysis and are saved in the main memory 109.

Step S206:

The restoration circuit 117 executes an inverse discrete wavelet transformation process for the coefficients processed by the frequency coefficient conversion circuit 116 to generate an image that has undergone a plurality of image processes.

Figure 7:
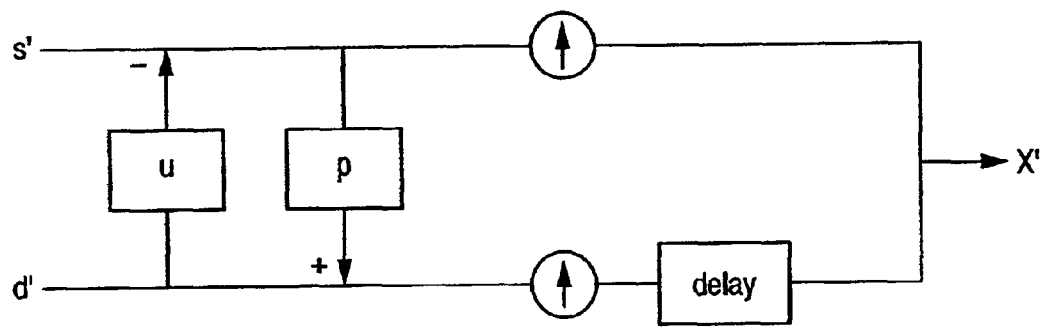
FIG. 7 is a diagram for explaining the arrangement of a restoration circuit of the X-ray photography apparatus according to the first embodiment of the present invention.

More specifically, for example, FIG. 7 shows an arrangement for a linear inverse discrete wavelet transformation process corresponding to the arrangement of the discrete wavelet transformation process shown in FIG. 3A. With this arrangement, coefficients to be processed (input coefficients) s' and d' undergo filter processes using two filters u and p, and are added to each other after being up-sampled, thus outputting an image signal x'.

These processes are described by:

$$x'(2*n)=s'(n)-\text{floor}((d'(n-1)+d'(n))/4) \quad (11)$$

$$x'(2*n+1)=d'(n)+\text{floor}((x'(2*n)+x'(2*n+2))/2) \quad (12)$$

The restoration circuit 117 executes the aforementioned linear inverse discrete wavelet transformation process for wavelet coefficients. Two-dimensional inverse discrete wavelet transformation is implemented by sequentially executing linear inverse transformation in the horizontal and vertical directions of an image. Since details of this process are known to those who are skilled in the art, a description thereof will be omitted.

As described above, the original image that has undergone the noise removal process, sharpening process, and dynamic range change process in the image processing circuit 112 is, for example, displayed on the screen of the display 111 under the control of the CPU 108.

As described above, according to the first embodiment, an original image is decomposed into a plurality of frequency components, which are analyzed for the noise removal process and sharpening process. Based on these analysis results, predetermined frequency components undergo conversion processes for the noise removal process and sharpening process. Then, an image that has undergone the noise removal process and sharpening process is generated based on the frequency components after the conversion processes. Hence, the noise removal process and sharpening process can be effectively executed without causing any conflicting effects or interference between the noise removal process and sharpening process.

Also, a plurality of frequency components of an original image are analyzed for the dynamic range change (compression or the like) process and sharpening process. Based on the analysis results, predetermined frequency components undergo conversion processes for the dynamic range change process and sharpening process. Then, an image that has undergone the dynamic range change process and sharpening process is generated based on the frequency components after the conversion processes. Hence, the influences of the dynamic range change process and sharpening process can be prevented from interfering with each other, and deterioration of image quality can also be prevented. Also, the dynamic range change process and sharpening process can be effectively and efficiently executed.

Since the noise removal process, sharpening process, and dynamic range change process can be executed without any conflicting effects or interference, the purposes of these processes can be achieved. Therefore, the image quality of an image that has undergone the noise removal process, sharpening process, and dynamic range change process can be improved.

An original image is decomposed into a plurality of frequency components, which are analyzed for a plurality of image processes. Based on these analysis results, predetermined frequency components undergo conversion processes for the plurality of image processes. Then, an image that has undergone the plurality of image processes is generated on the basis of the frequency components after the conversion processes. Hence, the plurality of image processes can be effectively and efficiently executed, thus shortening the processing time.

<Second Embodiment>

Figure 8:
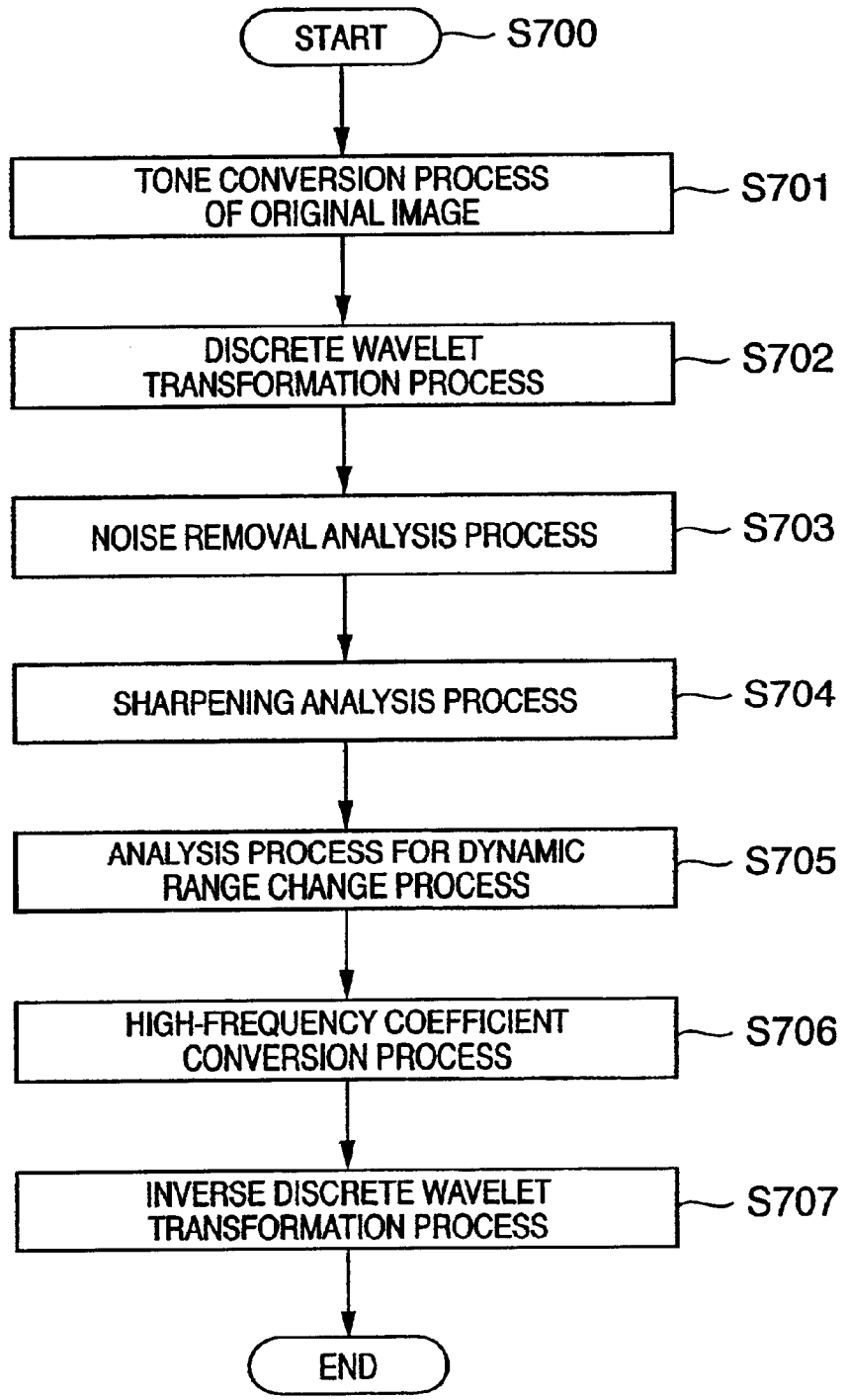
FIG. 8 is a flow chart for explaining the operation of an X-ray photography apparatus according to the second embodiment of the present invention.

In the second embodiment, the X-ray photography apparatus 100 shown in FIG. 1 operates according to, e.g., the flow chart shown in FIG. 8.

Step S700:

The X-ray photography apparatus 100 takes an X-ray image of the object 103 as in step S200 shown in FIG. 2, and an X-ray image that has undergone the pre-processes is transferred to the image processing circuit 112 as an original image.

Step S701:

In the image processing circuit 112, the tone conversion circuit 113 converts an original image Org(x, y) using a tone conversion curve (tone conversion function) f( ) as a part of the dynamic range change (compression or the like) process to generate an image f(Org(x, y)) after tone conversion.

Note that (x, y) indicates the position (coordinates) of a pixel on the image.

Step S702:

The frequency component decomposition circuit 115 executes a two-dimensional discrete wavelet transformation process for the image f(Org(x, y)) as in the process in step S201 shown in FIG. 2 to acquire coefficients of a plurality of frequency bands (subbands).

Step S703:

The analysis circuit 114 determines a region which is to undergo the noise removal process, on the basis of pixel values of the original image Org(x, y).

More specifically, for example, the analysis circuit 114 determines a region having pixel values equal to or smaller than a predetermined pixel value Th in the original image Org(x, y) as a region which is to undergo the noise removal process, and saves information that pertains to a region (positions of coefficients) in a predetermined high-frequency subband corresponding to this region in the main memory 109.

Step S704:

The analysis circuit 114 analyzes for coefficient conversion for the sharpening process as in the process in step S203 shown in FIG. 2, and saves the analysis result in the main memory 109.

Step S705:

The analysis circuit 114 analyzes for coefficient conversion as a part of the dynamic range change process by:

$$h2n(x, y)/hn(x, y)=(1/f'(Org(x, y))) \qquad (13)$$

and saves the analysis result in the main memory 109.

In equation (13), "hn(x, y)" is the frequency coefficient of subband n (predetermined high-frequency subband), and "h2n(x, y)" is the frequency coefficient of subband n after "hn(x, y)" has undergone coefficient conversion as a part of the dynamic range change process.

Therefore, "h2n(x, y)/hn(x, y)" indicates the degree of conversion (a multiplier to be multiplied by the frequency coefficient for the purpose of conversion) of a coefficient as a part of the dynamic range change process, and this multiplier and its position (coordinates) are saved in the main memory 109.

Step S706:

The frequency coefficient conversion circuit 116 replaces the coefficients of a predetermined high-frequency subband corresponding to the region which is to undergo noise removal, which is saved in the main memory 109, by a value smoothed using coefficients of a surrounding region including the coefficients. Note that smoothing is done by averaging coefficients in a predetermined surrounding region including them.

The frequency coefficient conversion circuit 116 combines (e.g., multiplies) the degrees of change (the degrees of change in high-frequency coefficient, e.g., multipliers to be multiplied by frequency coefficients) analyzed by the analysis circuit 114 in steps S704 and S705, and changes coefficients of predetermined high-frequency subbands (may include a high-frequency subband including the smoothed region) on the basis of the combined (multiplication) result. Note that this coefficient change process is executed only when the coefficient of a high-frequency subband hn(x, y) to be processed is smaller than a threshold value THn set for each subband n.

Step S707:

The restoration circuit 117 executes an inverse discrete wavelet transformation process for the coefficients processed by the frequency coefficient conversion circuit 116 to generate an image that has undergone a plurality of image processes, as in the process in step S206 shown in FIG. 2.

In the second embodiment, the coefficients of the low-frequency band (subband LL) obtained by decomposing an image into components of a plurality of frequency bands are not changed in the dynamic range change process unlike in the first embodiment. In general, as coefficients in a lower-frequency band are changed, the influence range of that coefficient change process broadens on the restored image (an image generated by an inverse transformation process to a predetermined frequency transformation process (frequency component decomposition process) such as an inverse DWT process to a DWT process).

For this reason, the influence range of the coefficient change process can be effectively narrowed down by changing coefficients of higher-frequency bands in place of changing those of the lowest-frequency band. Furthermore, coefficients used to form the edge structure in an original image exhibit relatively large values (absolute values) in respective subbands except for the lowest-frequency subband (subband LL).

Hence, not changing coefficients equal to or higher than a predetermined threshold value or suppressing the degree of change in such coefficient is effective to preserve the edge structure in the restored image. This means that artifacts called overshoot over the like are hardly generated in the edge portion of the restored image.

Therefore, according to the second embodiment, collapse of the edge structure or overshoot in the edge portion hardly occurs in the reconstruction (processed image) in addition to the effects in the first embodiment.

In the first embodiment as well, by adding the following, relatively complicated arrangement, the same effect can be obtained. More specifically, when the absolute value of a given coefficient of each high-frequency band (each high-frequency subband), which corresponds to the coefficient of the lowest-frequency band (subband LL) which is to undergo the coefficient change process, is larger than a predetermined threshold value, the final value of that high-frequency coefficient is processed to have a value which is obtained when a corresponding high-frequency coefficient of an original image is changed (e.g., remains unchanged or is multiplied by a predetermined multiplier) to the same degree as that of change in corresponding coefficient of the lowest frequency band. In this manner, collapse of the edge structure or overshoot in the edge portion hardly occurs in the restored image (processed image).

<Third Embodiment>

Figure 9:
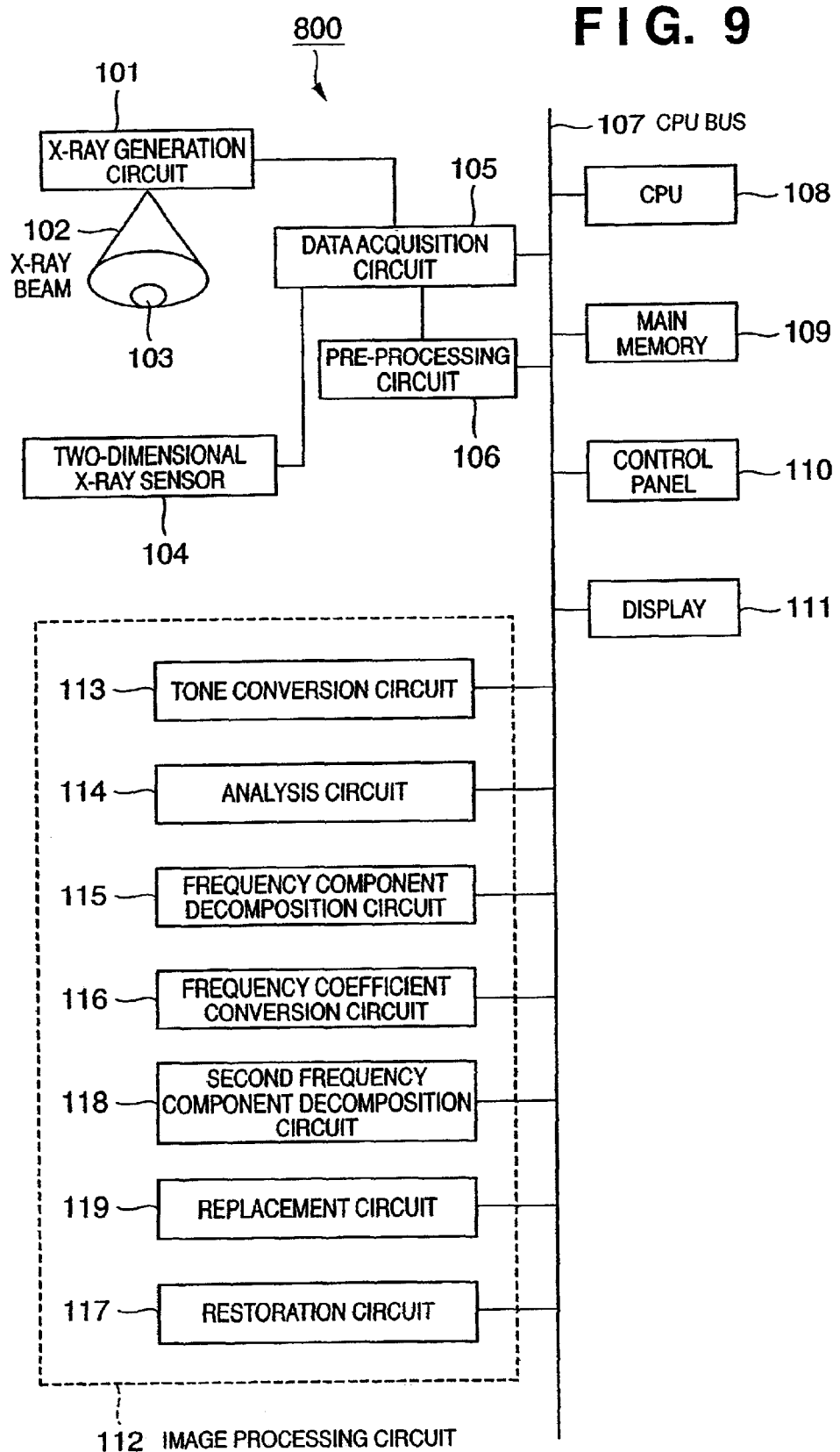
FIG. 9 is a block diagram showing the arrangement of an X-ray photography apparatus according to the third embodiment of the present invention.

The present invention is applied to an X-ray photography apparatus 800 shown in, e.g., FIG. 9.

Note that the same reference numerals in the X-ray photography apparatus 800 of the third embodiment denote the same parts as in the X-ray photography apparatus 100 shown in FIG. 1, and a detailed description thereof will be omitted. Especially, in the X-ray photography apparatus 800 of the third embodiment, a second frequency component decomposition circuit 118 and replacement circuit 119 are added to the image processing circuit 112, in addition to the arrangement of the X-ray photography apparatus 100 shown in FIG. 1.

The second frequency component decomposition circuit 118 executes a DWT process of an original image that has undergone tone conversion in the tone conversion circuit 113.

The replacement circuit 119 replaces high-frequency coefficients (high-frequency subbands) obtained by the DWT process in the second frequency component decomposition circuit 118 by those obtained by conversion in the frequency coefficient conversion circuit 116.

Figure 10:
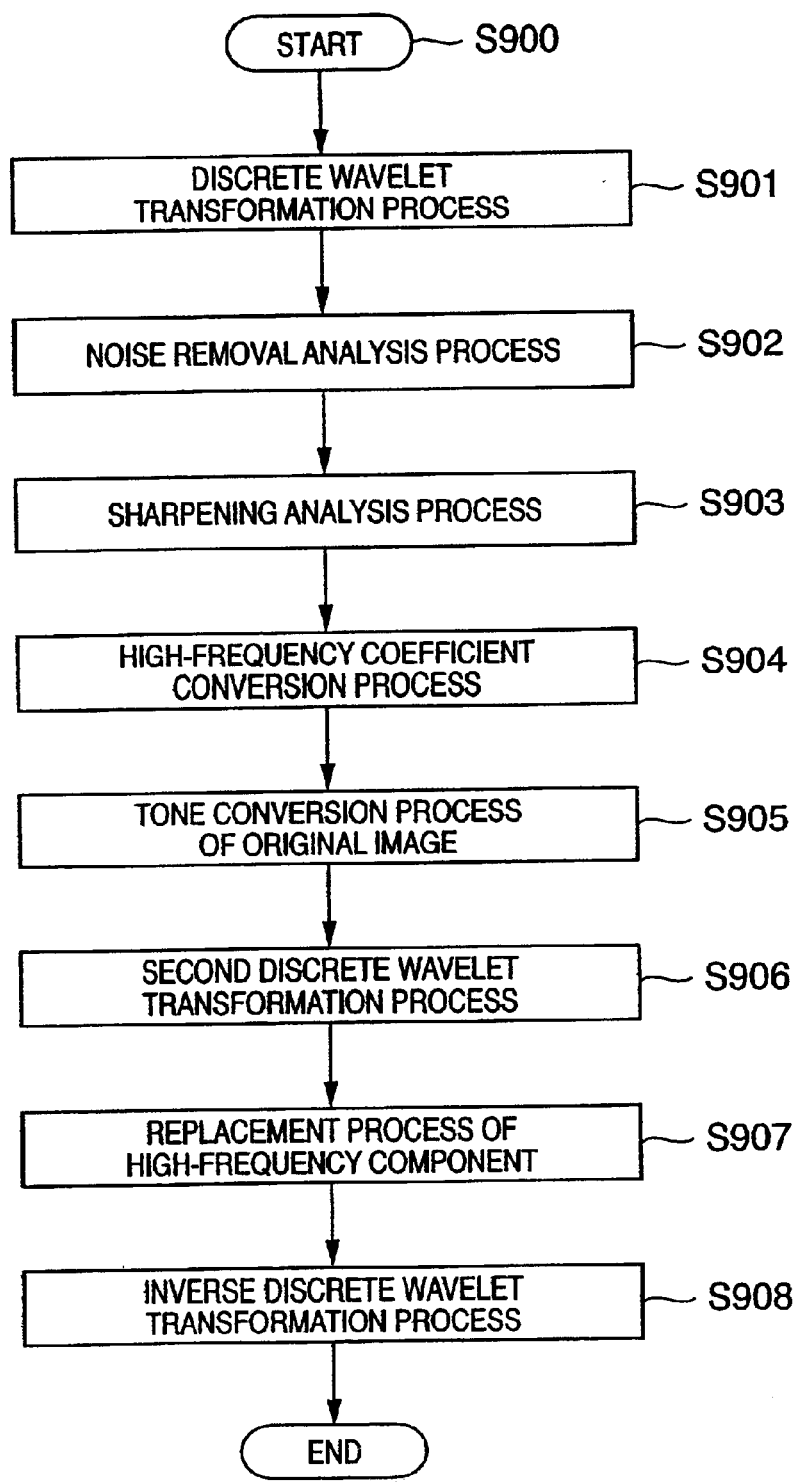
FIG. 10 is a flow chart for explaining the operation of the X-ray photography apparatus according to the third embodiment of the present invention.

The operation of the X-ray photography apparatus 800 mentioned above will be explained below using the flow chart in FIG. 10.

Note that the same reference numerals in the X-ray photography apparatus 800 in FIG. 9 denote the same building components as those in the X-ray photography apparatus 100 in FIG. 1, and a detailed description thereof will be omitted. In this embodiment, only the arrangement and operation different from those of the X-ray photography apparatus 100 in FIG. 1 will be described in detail.

Step S900:

The X-ray photography apparatus 100 takes an X-ray image of the object 103 as in step S200 shown in FIG. 2, and an X-ray image that has undergone the pre-processes is transferred to the image processing circuit 112 as an original image.

Step S901:

In the image processing circuit 112, the frequency component decomposition circuit 115 executes a two-dimensional discrete wavelet transformation process for an original image Org(x, y) as in the process in step S201 shown in FIG. 2 to acquire coefficients of a plurality of frequency bands.

Step S902:

The analysis circuit 114 analyzes the degree of frequency conversion for the noise removal process, i.e., information associated with the pixel (coefficient) to be processed (e.g., the position of the coefficient to be processed and processed coefficient value) as in the process in step S202 shown in FIG. 2, and saves the analysis result in the main memory 109.

Step S903:

The analysis circuit 114 analyzes the degree of coefficient conversion for the sharpening process (e.g., a multiplier for each coefficient to be processed) as in the process in step S203 shown in FIG. 2, and saves the analysis result in the main memory 109.

Step S904:

The frequency coefficient conversion circuit 116 changes high-frequency coefficients (coefficients of predetermined high-frequency subbands) obtained by the frequency component decomposition circuit 115 on the basis of the analysis results saved in the main memory 109 as in the process in step S205 shown in FIG. 2.

Step S905:

The tone conversion circuit 114 executes tone conversion of the original image as a part of the dynamic range change (compression or the like) process.

Step S906:

The second frequency component decomposition circuit 118 executes a DWT process of the original image that has undergone tone conversion by the tone conversion circuit 113.

Step S907:

The replacement circuit 119 replaces high-frequency coefficients (coefficients of predetermined high-frequency subbands) obtained by the second frequency component decomposition circuit 118 by those obtained by the frequency coefficient conversion circuit 116. At this time, coefficients of the lowest-frequency band (subband LL) are not replaced so as not to lose the effect of the dynamic range change process.

Note that this coefficient replacement is to be executed only when a coefficient of a high-frequency subband hn(x, y) to be processed is smaller than a threshold value THn set for each subband. Hence, as in the second embodiment, it is effective to suppress collapse of the edge structure in a restored image. In this manner, frequency coefficients that have undergone the noise removal process, sharpening process, and dynamic range change process can be obtained.

Step S908:

The restoration circuit 117 executes an inverse discrete wavelet transformation process for the frequency coefficients processed by the replacement circuit 119 to generate an image which has undergone the noise removal process, sharpening process, and dynamic range change process.

As described above, in the third embodiment, in addition to the effect of the second embodiment, since the high-frequency coefficients of an original image undergo analysis for frequency processes such as the noise removal process, sharpening process, and the like, the analysis results are not influenced by pixel values changed by tone conversion compared to the second embodiment that executes the analysis for high-frequency components of an image after the original image has undergone tone conversion, and the analysis can be facilitated.

<Fourth Embodiment>

Figure 11:
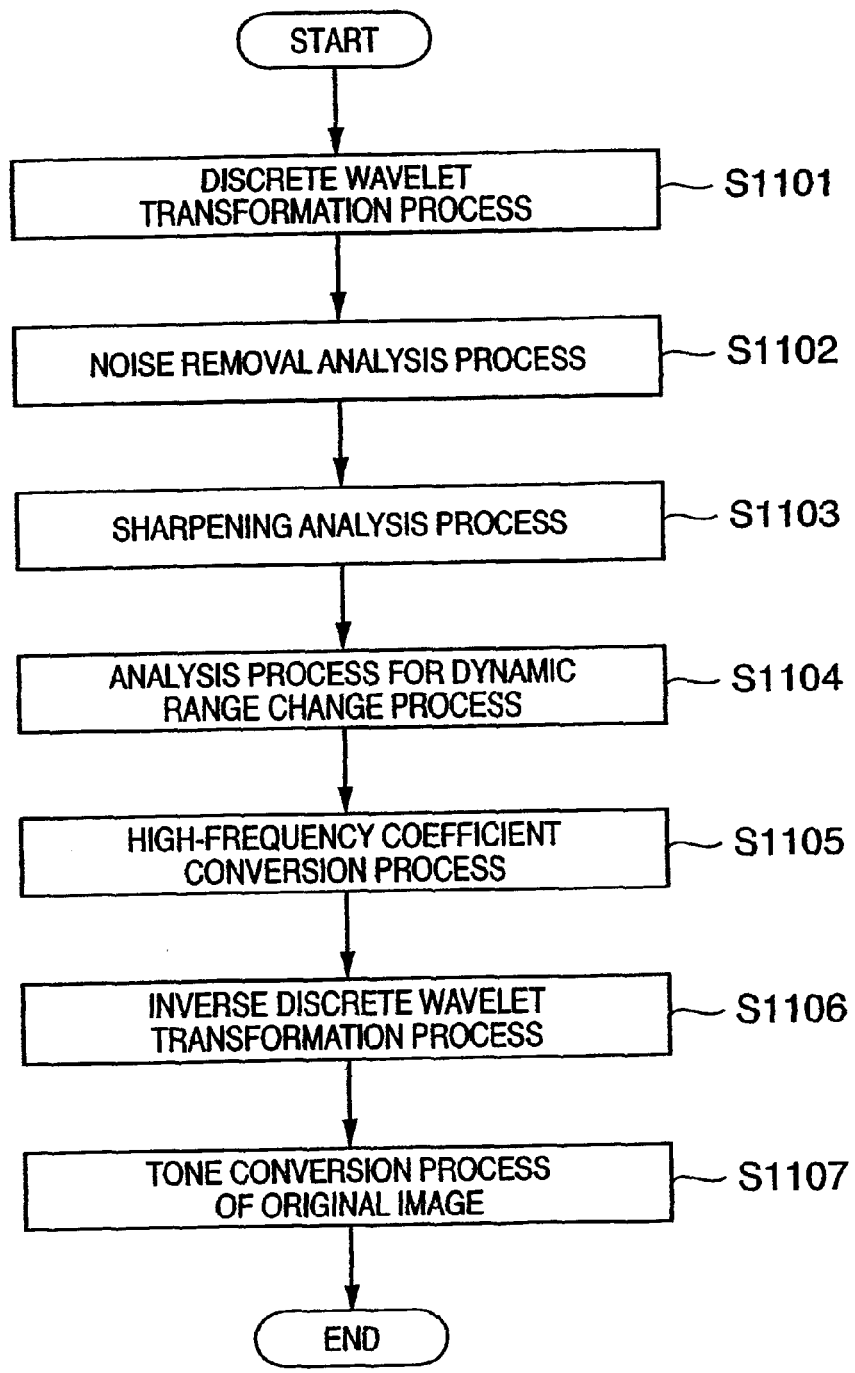
FIG. 11 is a flow chart for explaining the operation of an X-ray photography apparatus according to the fourth embodiment of the present invention.

In the fourth embodiment, the X-ray photography apparatus 100 shown in FIG. 1 operates according to, e.g., the flow chart shown in FIG. 11.

Step S1100:

The X-ray photography apparatus 100 takes an X-ray image of the object 103 as in step S200 shown in FIG. 2, and an X-ray image that has undergone the pre-processes is transferred to the image processing circuit 112 as an original image.

Step S1101:

The frequency component decomposition circuit 115 executes a two-dimensional discrete wavelet transformation process for an original image Org(x, y) as in the process in step S201 shown in FIG. 2 to acquire coefficients of a plurality of frequency bands (subbands).

Step S1102:

The analysis circuit 114 determines a region which is to undergo the noise removal process on the basis of the pixel values of the original image Org(x, y).

More specifically, for example, the analysis circuit 114 determines a region having pixel values equal to or smaller than a predetermined pixel value Th in the original image Org(x, y) as a region which is to undergo the noise removal process, and saves information that pertains to a region (positions of coefficients) in a predetermined high-frequency subband corresponding to this region in the main memory 109.

Step S1103:

The analysis circuit 114 analyzes for coefficient conversion for the sharpening process as in the process in step S203 shown in FIG. 2, and saves the analysis result in the main memory 109.

Step S1104:

The analysis circuit 114 analyzes for coefficient conversion as a part of the dynamic range change process using equation (13) above, and saves the analysis result in the main memory 109.

In equation (13), "hn(x, y)" is the frequency coefficient of subband n (predetermined high-frequency subband), and "h2n(x, y)" is the frequency coefficient of subband n after "hn(x, y)" has undergone coefficient conversion as a part of the dynamic range change process. Therefore, "h2n(x, y)/hn (x, y)" indicates the degree of conversion (a multiplier to be multiplied by the frequency coefficient for the purpose of conversion) of a coefficient as a part of the dynamic range change process, and this multiplier and its position (coordinates) are saved in the main memory 109.

Step S1105:

The frequency coefficient conversion circuit 116 replaces the coefficients of a predetermined high-frequency subband corresponding to the region which is to undergo noise removal, which is saved in the main memory 109, by a value smoothed using coefficients of a surrounding region including the coefficients. Note that smoothing is done by averaging the coefficients in a predetermined surrounding region including the coefficients.

The frequency coefficient conversion circuit 116 combines (e.g., multiplies) the degrees of change (the degrees of change in high-frequency coefficient, e.g., multipliers to be multiplied by frequency coefficients) analyzed by the analysis circuit 114 in steps S1103 and S1104, and changes coefficients of predetermined high-frequency subbands (may include a high-frequency subband including the smoothed region) on the basis of the combined (multiplication) result. Note that this coefficient change process is executed only when the coefficient of a high-frequency subband hn(x, y) to be processed is smaller than a threshold value THn set for each subband n.

Step S1106:

The restoration circuit 117 executes an inverse discrete wavelet transformation process for the coefficients processed by the frequency coefficient conversion circuit 116 to generate an image that has undergone a plurality of image processes, as in the process in step S206 shown in FIG. 2.

Step S1107:

The tone conversion circuit 113 executes a tone conversion process using a tone conversion curve (tone conversion function) f( ) for an image Prc(x, y) after the inverse discrete wavelet transformation process in the restoration circuit 117 to generate an image f(Prc(x, y)) after tone conversion.

In the second embodiment mentioned above, coefficient conversion is executed after the original image that has undergone tone conversion undergoes a discrete wavelet transformation process, and inverse transformation is finally executed to obtain a processed image. By contrast, in the fourth embodiment, after an original image undergoes a discrete wavelet transformation process, coefficient conversion is executed. Then, inverse transformation is executed to generate an image, and the generated image finally undergoes tone conversion to obtain a processed image.

When the analysis process is executed after the image that has undergone tone conversion undergoes a discrete wavelet transformation process like in the second embodiment, the region and strength of the sharpening process and noise removal process must be determined in consideration of the influence of tone conversion. However, when the analysis process is executed after an original image undergoes a discrete wavelet transformation process like in the fourth embodiment, the analysis process can be facilitated since the influence of tone conversion need not be taken into consideration.

Therefore, in the fourth embodiment, the analysis process can be easily or accurately executed, and the processed image can be efficiently or effectively obtained, in addition to the effect of the second embodiment.

As described above, in the first to fourth embodiments, when an objective image (radiation image or the like) is to undergo a plurality of image processes (a plurality of image processes such as a noise removal process, sharpening process, dynamic range change process, and the like), the objective image is decomposed into a plurality of frequency components, which are analyzed in association with each of the plurality of image processes, coefficients of the plurality of frequency components are converted on the basis of the analysis results, and an image that has undergone the plurality of image processes is generated based on the plurality of converted frequency components.

In this manner, a plurality of image processes can be effectively and efficiently done without any conflicting effects or interference.

For example, when an objective image undergoes a noise removal process and sharpening process, these processes can be effectively and efficiently executed without causing any conflicting effects or interference between these processes.

Also, when an objective image is to undergo a sharpening process and dynamic range change process, since the influences of these processes do not interfere with each other and image quality can be prevented from deteriorating, these processes can be effectively and efficiently executed.

When an objective image is to undergo a noise removal process, sharpening process, and dynamic range change process, these processes can be executed without any conflict and interference, and the purposes of these processes can be achieved.

For this reason, the image quality can be improved, and the noise removal process, sharpening process, and dynamic range change process can be effectively and efficiently executed.

When the absolute value of a given coefficient of a high-frequency band is larger than a predetermined threshold value, that coefficient is not changed, the degree of change in coefficient is suppressed, or that coefficient is changed in accordance with a change in coefficient of a predetermined low-frequency component corresponding to that coefficient. In such case, collapse of the edge structure, overshoot in an edge portion, or the like can be suppressed in a processed image.

High-frequency components of an original image undergo an analysis process for frequency processes such as a noise removal process, sharpening process, and the like. In such case, since the analysis result is not influenced by pixel values changed by tone conversion compared to a case wherein the analysis process is executed for high-frequency coefficients of an image after the original image has undergone tone conversion, the analysis process can be facilitated.

<Fifth Embodiment>

Along with the advance of digital technologies in recent years, a radiation image is converted into a digital image signal, such digital image signal undergoes an image process such as a frequency process, and the processed image is output by being displayed on a CRT or the like, or being drawn on a film by a printer.

Such frequency process is done by decomposing an image into image components of a plurality of frequency bands, and increasing or decreasing image components for each frequency band. Also, the effect of the frequency process is adjusted depending on the pixel values of an image or those of a low-frequency band. Furthermore, a process for reducing noise by improving the image quality of a noise region has been developed. Moreover, a process for compressing the dynamic range is done.

However, in the above method, the effects of image processes are adjusted depending on the pixel values of an original image or those of a low-frequency image of the original image. In general, an image that has undergone such frequency processes is recorded or displayed by a printer or CRT after tone conversion. The pixel value distribution of an image that has undergone the dynamic range change process has been relatively largely changed from that of the original image.

The conventional frequency process is executed depending on the pixel values of the original image or its low-frequency components, although the pixel value distribution of the image has been changed by the tone conversion process or dynamic range change process.

As a result, the frequency process is done disregarding the levels of pixel values (e.g., the density values of an image recorded on a film) of a final output image (visible image). Therefore, the conventional process does not consider the fact that the human visual sensitivity varies depending on the levels of density or luminance values and, hence, processing effects cannot be obtained in correspondence with the visual sensitivity. Also, a tone conversion function (e.g., a curve form of a tone conversion curve or the like) is changed according to viewer's favor, and the levels of density or luminance values of pixels of a final output image can be changed accordingly. However, such change is not reflected in the frequency process and the like.

Also, in order to obtain stable processing effects, it is often effective to analyze the pixel value distribution or noise distribution of an image prior to the process. However, the pixel value distribution often largely varies depending on the object, and such tendency is strong in case of a living body such as a human body or the like. Furthermore, the noise distribution varies depending on a photographing condition and the like. For this reason, it is difficult in practice to appropriately execute the frequency process in accordance with the analysis result of the pixel value distribution.

Moreover, in the frequency process that depends on the pixel values of an original image, criteria upon correcting the processing effects (processing contents) are not determined, and it is not easy to adjust the processing effects. This is because the pixel value distribution and noise distribution vary depending on the object and photographing condition.

The fifth to eighth embodiments to be described hereinafter have been made to solve the aforementioned problems, and an arrangement that stabilizes image processing effects depending on the density or luminance values of an image output (recorded or displayed) on a film or CRT will be explained.

Figure 12:
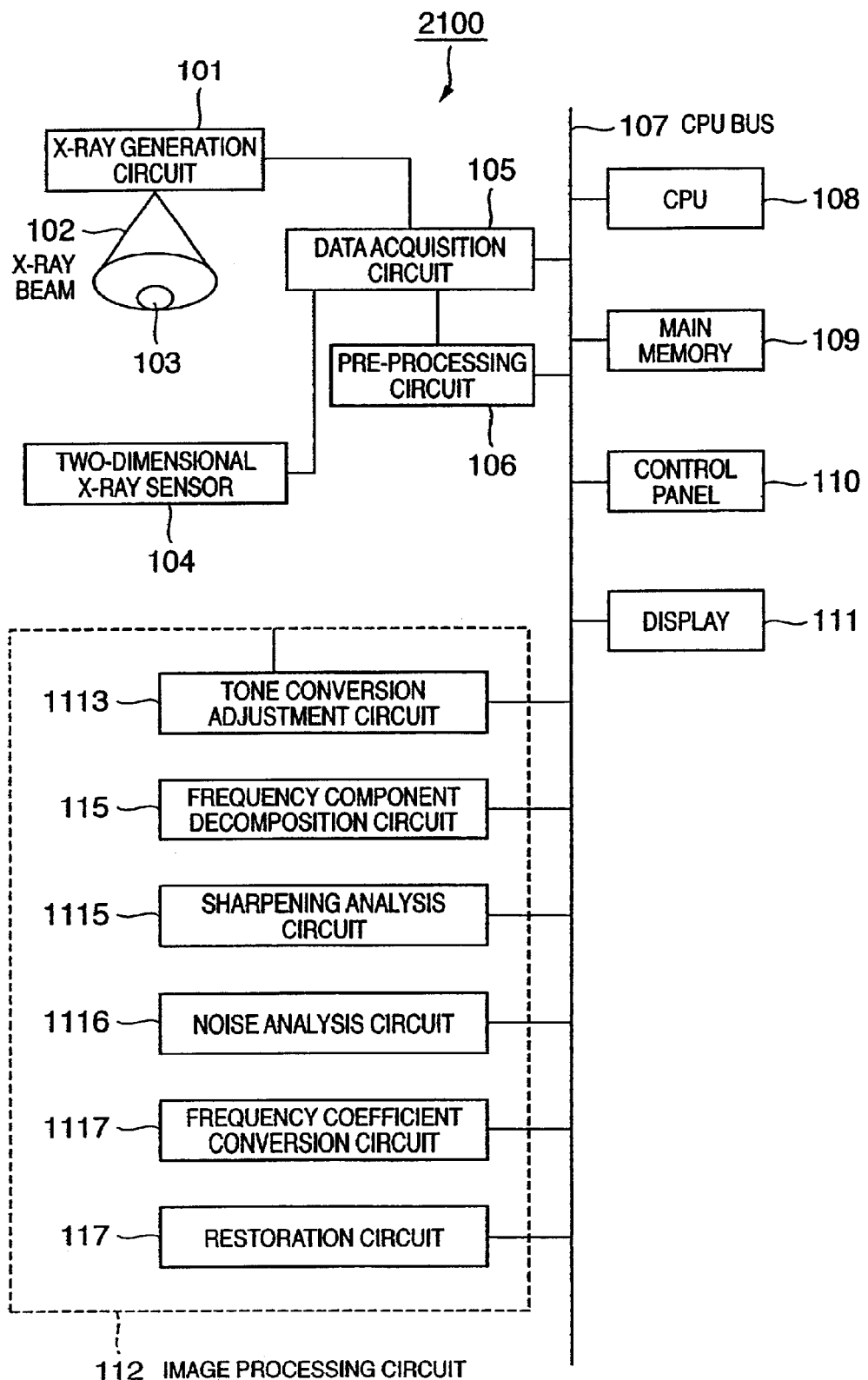
FIG. 12 is a block diagram showing the arrangement of an X-ray photography apparatus according to the fifth embodiment of the present invention.

The present invention is applied to an X-ray apparatus 2100 shown in, e.g., FIG. 12.

Note that the same reference numerals in the X-ray photography apparatus 2100 of the fifth embodiment denote the same parts as those in the X-ray photography apparatus 100 shown in FIG. 1, and a detailed description thereof will be omitted.

In the image processing circuit 112, a tone conversion adjustment circuit 1113 makes tone conversion of an original image. Also, the circuit 1113 generates a tone conversion curve upon making tone conversion, and displays a tone-converted image on the display 111. Note that the operator can create a new tone conversion curve or can change an existing one.

Figure 13:
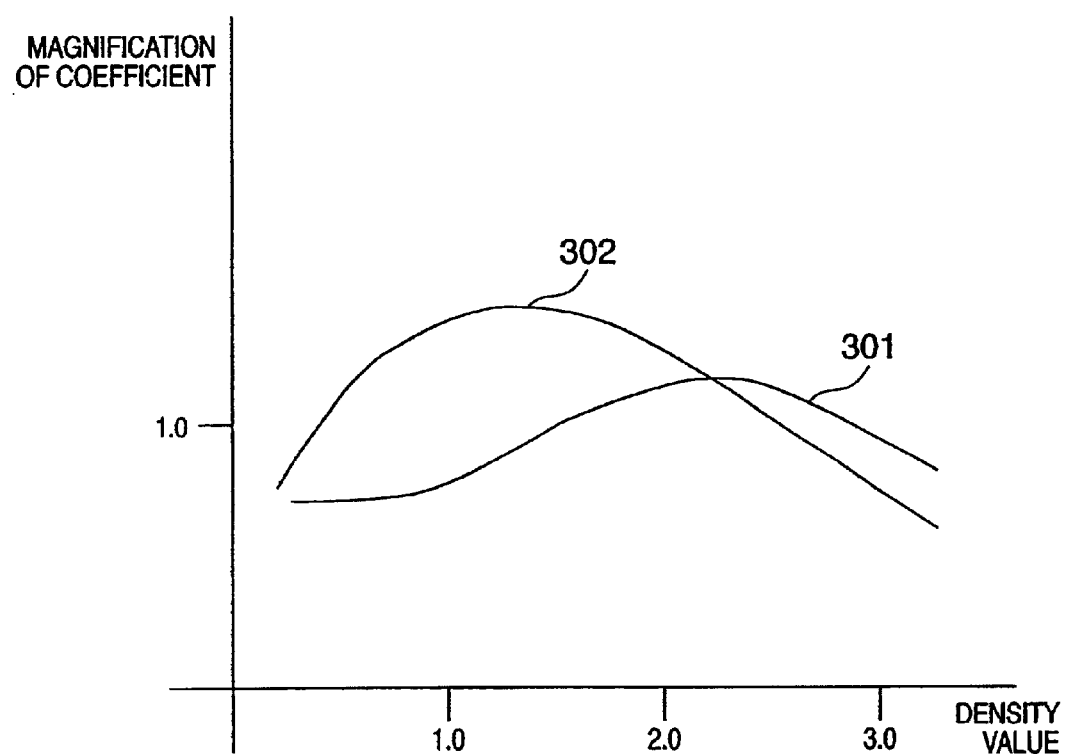
FIG. 13 is a graph showing the relationship between the density value and conversion level of a coefficient in the fifth embodiment of the present invention.

A sharpening analysis circuit 1115 analyzes the conversion contents of each coefficient (e.g., specifies the conversion magnification of each coefficient) on the basis of the tone conversion curve (e.g., a tone conversion curve 401 shown in FIG. 14) determined by the tone conversion adjustment circuit 1113, and a coefficient conversion pattern shown in FIG. 13 (note that FIG. 13 shows two different coefficient conversion patterns 301 and 302 as examples of the coefficient conversion pattern).

Figure 14:
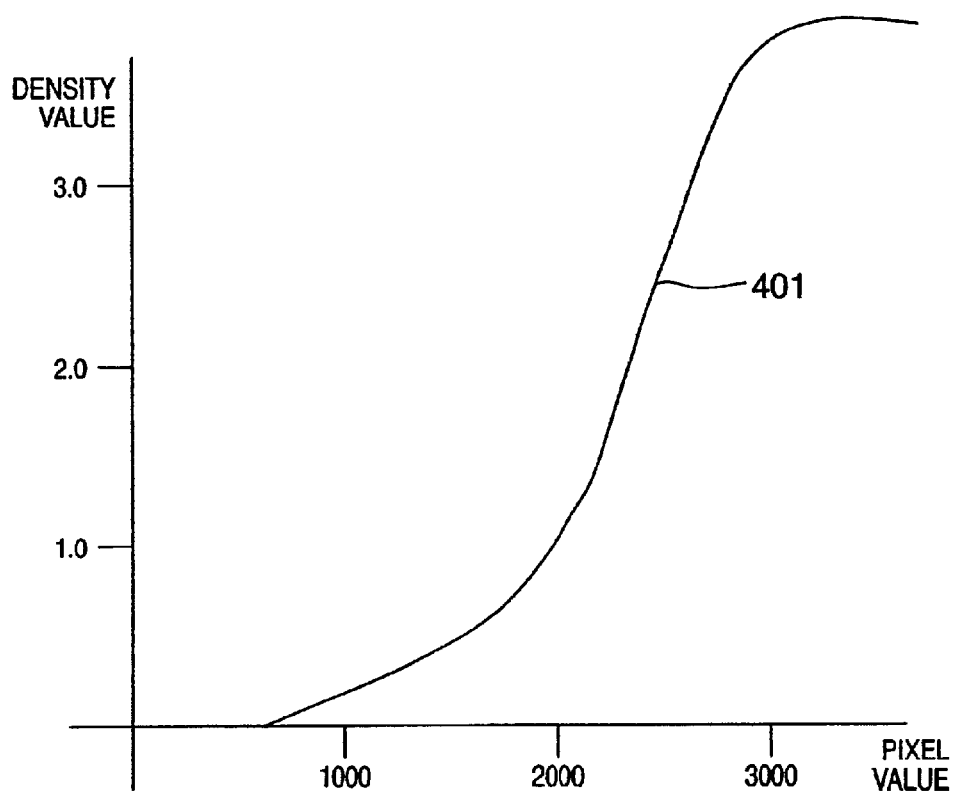
FIG. 14 shows a tone conversion curve according to the fifth embodiment of the present invention.

Note that FIG. 13 shows the processing contents (processing effect) with respect to density values (in the following description, "density values" mean density or luminance values), i.e., coefficient conversion patterns according to the density values, in which the abscissa plots the density value, and the ordinate plots the change magnification upon changing a frequency coefficient. For example, when the density value is 1.0, a high-frequency coefficient is multiplied by 1, i.e., remains unchanged; when the density value is 0.5, a high-frequency coefficient is multiplied by 0.5. FIG. 14 shows an example of the tone conversion curve used in the tone conversion adjustment circuit 1113, and describes the conversion contents from the pixel values to density values using the tone conversion curve. The shape of this tone conversion curve can be changed by operator's operations or the like via the control panel 110.

A noise analysis circuit 1116 makes analysis for a noise removal process. Details of this circuit will be explained in the sixth embodiment.

A frequency coefficient conversion circuit 1117 executes a conversion process of high-frequency coefficients for respective frequency bands decomposed by the frequency component decomposition circuit 115 on the basis of the analysis result of the sharpening analysis circuit 1115.

Figure 15:
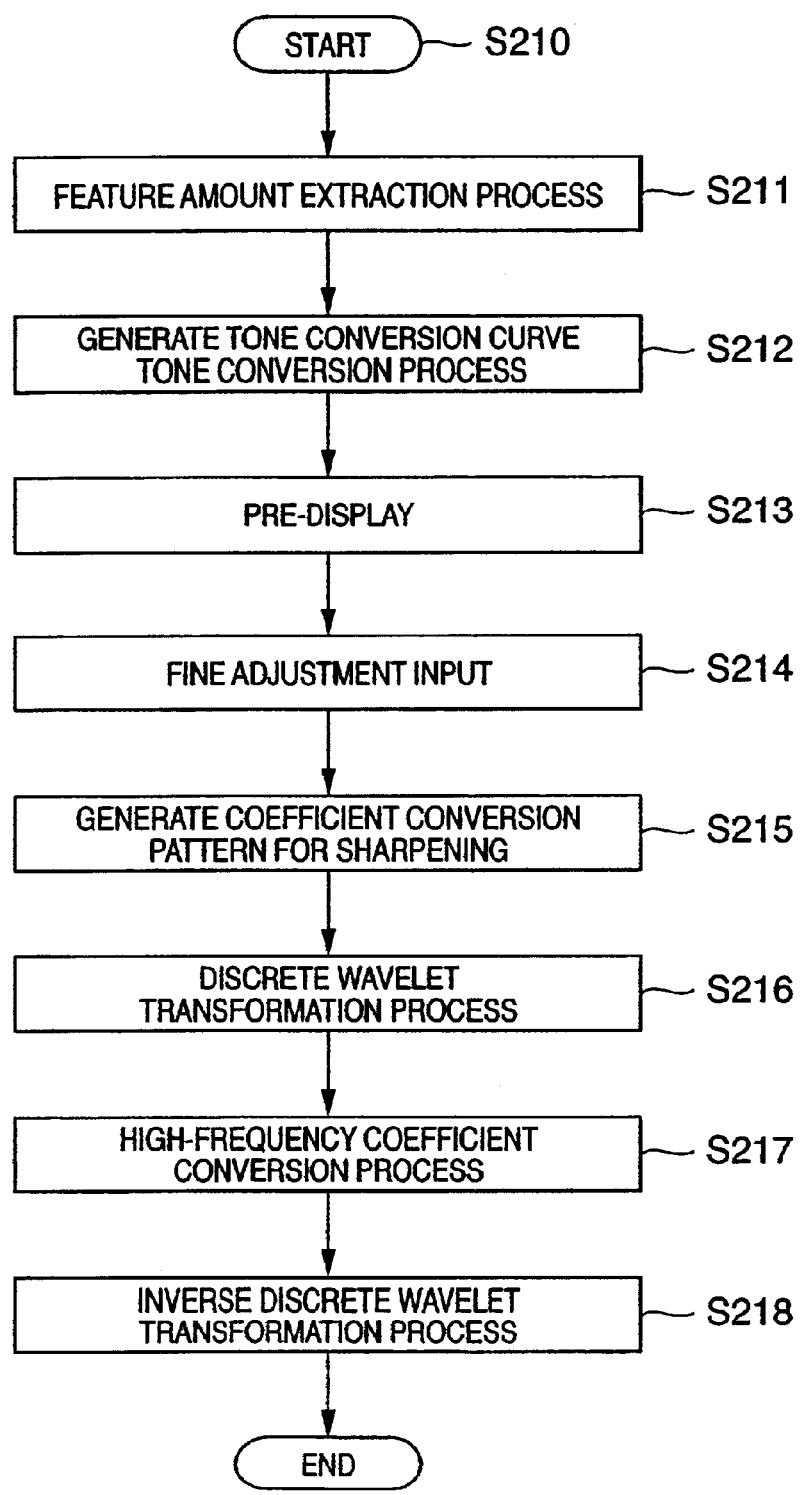
FIG. 15 is a flow chart for explaining the operation of the X-ray photography apparatus according to the fifth embodiment of the present invention.

FIG. 15 is a flow chart showing the operation of the X-ray photography apparatus according to the fifth embodiment of the present invention.

Step S210:

The X-ray photography apparatus 100 takes an X-ray image of the object 103 as in step S200 shown in FIG. 2, and an X-ray image that has undergone the pre-processes is transferred to the image processing circuit 112 as an original image.

Step S211:

In the image processing circuit 112, the tone conversion adjustment circuit 1113 calculates the pixel value of a feature portion of an object (e.g., a maximum pixel value in a lung is adopted as this feature amount in case of, e.g., a chest front image) by analyzing an original image f(x, y).

Step S212:

The tone conversion adjustment circuit 1113 generates a tone conversion curve shown in FIG. 14 so that a pixel value indicated by the feature amount has a given density, and executes tone conversion of the original image using this tone conversion curve.

Step S213:

The tone conversion adjustment circuit 1113 displays the image after tone conversion on the display 111.

Step S214:

The operator checks the image automatically displayed on the display 111. If the operator determines that the image is appropriately tone-converted, input of an OK signal is accepted via the control panel 110. On the other hand, if the operator determines that the image is not appropriately tone converted, input of information which indicates the relationship between pixel value X and density value Y of the tone conversion curve so as to finely adjust the shape of the tone conversion curve is accepted to determine a tone conversion curve after adjustment given by:

$$Y=F(X) \quad (14)$$

Step S215:

The sharpening analysis circuit 1116 analyzes a pattern that describes the relationship between the pixel value and the coefficient conversion magnification on the basis of the coefficient conversion pattern that indicates the relationship between density Y and the coefficient magnification shown in FIG. 13, and equation (14). The relationship between density Y and conversion magnification K shown in FIG. 13 is given by:

$$K=G(Y) \quad (15)$$

Hence, equations (14) and (15) yield:

$$K=G(F(X)) \quad (16)$$

and the relationship between pixel value X and coefficient conversion magnification K can be analytically obtained.

Note that the coefficient conversion pattern shown in FIG. 13 is selected depending on the photographed portion of an object or the photographing condition. For example, when the photographing X-ray dose is small, a coefficient conversion pattern 301 that relatively suppresses (or decreases) an increase in coefficient in a low-density range is selected. On the other hand, when the photographing X-ray dose is large, for example, a coefficient conversion pattern 302 is selected to also increase coefficients in a low-density range. Also, since the density value region of an object to be sharpened and sharpening strength vary depending on a portion to be photographed or a purpose of diagnosis, the coefficient conversion pattern is selected in correspondence with the portion and purpose intended.

Step S216:

The frequency component decomposition circuit 115 executes a two-dimensional discrete wavelet transformation process for an original image f(x, y) as in the process in step S201 shown in FIG. 2 to acquire coefficients of a plurality of frequency bands (subbands).

Step S217:

The frequency coefficient conversion circuit 1117 changes the coefficients of each of three subbands HL, LH, and HH indicating high-frequency coefficients of the acquired subbands on the basis of the relationship given by equation (16). Note that the coordinate position of each coefficient is uniquely determined by that of the original image f(x, y), and the coefficient is converted by obtaining pixel value X of the original image f(x, y) on the basis of the coordinate position of that coefficient.

Different coefficient conversion patterns may be prepared for respective subbands HL, LH, HH, and the like. However, normally, no problem is posed if coefficients of three subbands are converted using a single pattern.

Step S218:

The restoration circuit 117 executes an inverse discrete wavelet transformation process for the coefficients processed by the frequency coefficient conversion circuit 116 to generate a sharpened image, as in the process in step S206 shown in FIG. 2.

Normally, since the sharpening process effect is obtained upon increasing coefficients, and the smoothing effect is obtained upon decreasing coefficients, sharpening and smoothing can be attained at the same time depending on the density values of an output image in accordance with the shape of the coefficient conversion pattern, which indicates the relationship of density value Y and coefficient magnification K, as shown in FIG. 13.

As described above, according to the fifth embodiment, since the coefficients are increased/decreased on the basis of the density levels of an output image, a sharpening effect can be obtained in correspondence with the density level of an output image independently of a change in image density. Since a pattern that represents the relationship between the density and increase/decrease in coefficient is prepared, the operator can easily imagine the effect of the sharpening process, and can easily adjust the process contents.

Furthermore, since the relationship between the density value and increase/decrease in coefficient is described via the tone conversion curve that describes the relationship between the density and pixel values, even when the tone conversion curve of an image has been changed, an identical sharpening process effect can be easily obtained in practice for a given density level. Also, it is easy to adjust the density since the tone conversion curve can be corrected, and the sharpening process contents can be changed in correspondence with adjusted density.

Since the contents of the spatial frequency process can be specified based on the tone conversion curve, the operator need not adjust the processing contents, and can obtain a stable processing effect without any complicated analysis process. In addition, since the processing effect is specified in accordance with the density value of an output image, matching with the operator's visual sensitivity can be easily attained.

<Sixth Embodiment>

The sixth embodiment will explain an arrangement that stabilizes the noise removal effect depending on the density values of an output image (visible image). In FIG. 12, the noise analysis circuit 1116 is that for a noise removal process, and since other circuits execute the same processes as in the fifth embodiment, a description thereof will be omitted by denoting them using the same reference numerals.

Figure 16:
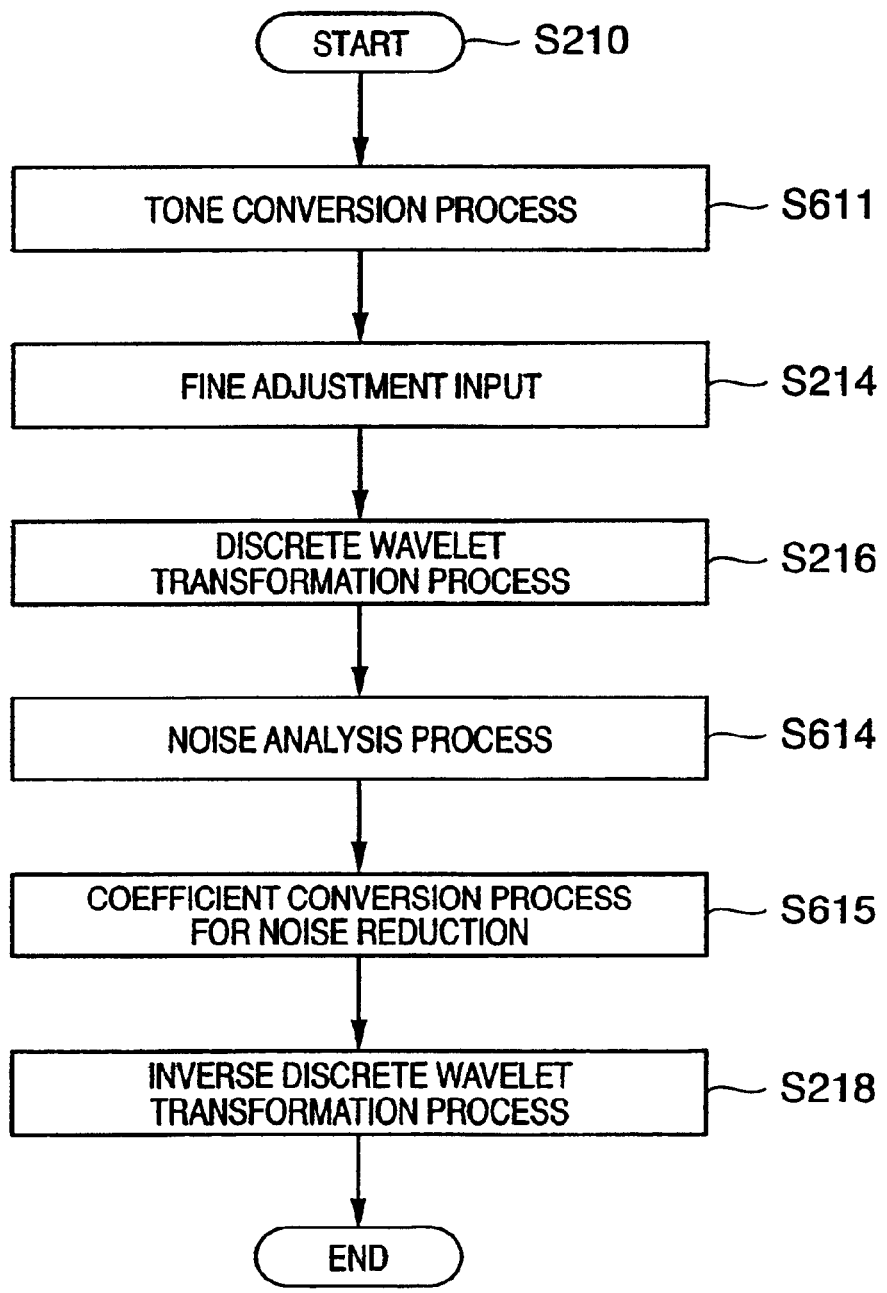
FIG. 16 is a flow chart for explaining the operation of an X-ray photography apparatus according to the sixth embodiment of the present invention.

FIG. 16 is a flow chart showing the operation of the X-ray photography apparatus according to the sixth embodiment of the present invention.

Note that the same step numbers in FIG. 16 denote the same processes as those in FIG. 15 of the fifth embodiment, and a description thereof will be omitted.

Figure 17:
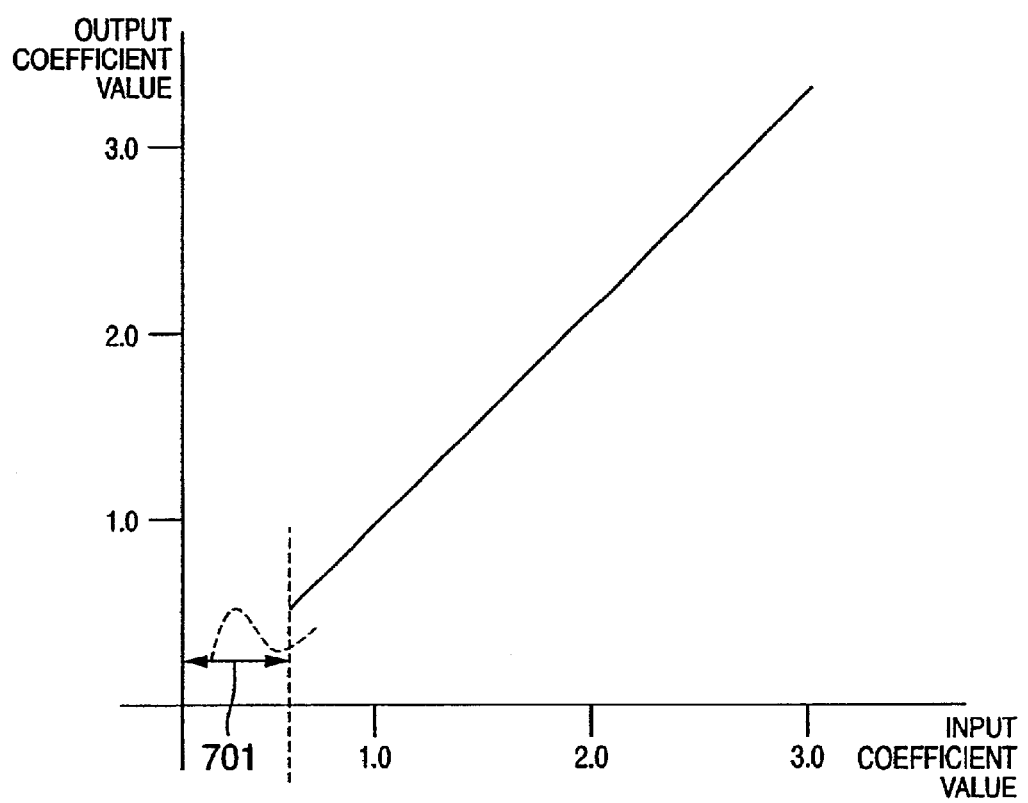
FIG. 17 shows a coefficient conversion curve for noise reduction according to the sixth embodiment of the present invention.

FIG. 17 shows a coefficient conversion curve for noise reduction, which is normally called cutoff or wavelet degeneration. In FIG. 17, the abscissa plots the input coefficient value, and the ordinate plots the converted coefficient value (output coefficient value). Note that reference numeral 701 denotes a range called a cutoff width, and the converted coefficient value is decreased to be smaller than the input coefficient value within the region of the cutoff width 701. As the cutoff width becomes broader, the range of decreasing coefficient values broadens, and the noise removal effect is emphasized.

Figure 18:
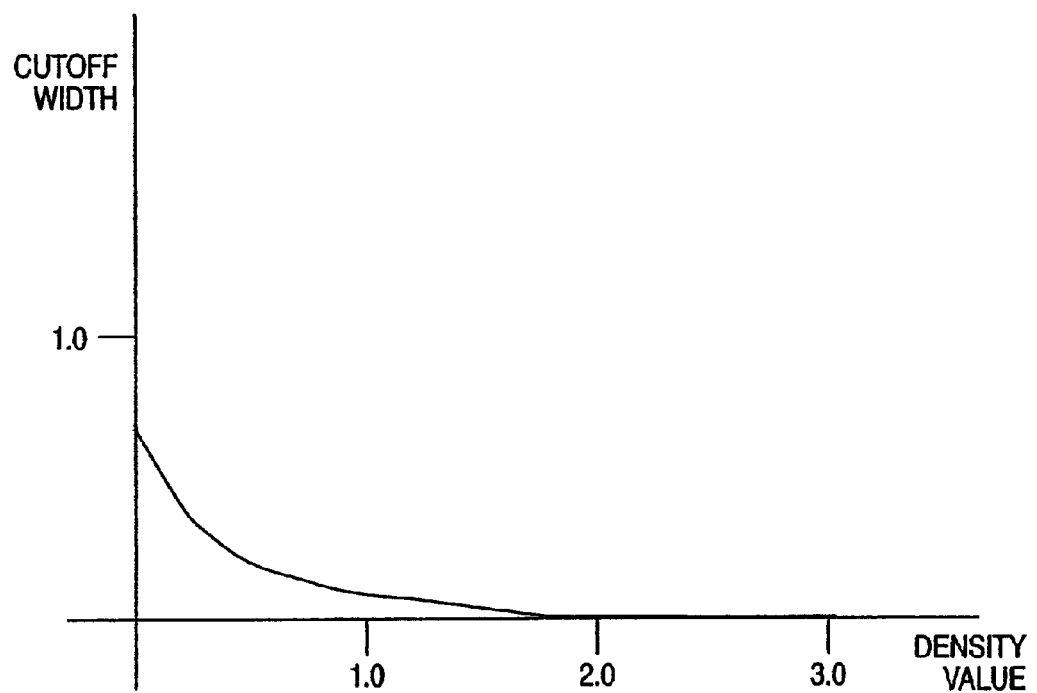
FIG. 18 is a graph showing the relationship between the cutoff width and density value according to the sixth embodiment of the present invention.

Furthermore, FIG. 18 shows the relationship between the cutoff width 701 in FIG. 17 and density value. In FIG. 18, the abscissa plots the density value and the ordinate plots the cutoff width. This relationship is changed in accordance with portion information, photographing information (photographing condition), and the like. Especially, the cutoff width 701 increases with lowering corresponding density value. Hence, the noise removal effect is emphasized with lowering density value.

Step S611:

The tone conversion adjustment circuit 1113 converts an original image Org(x, y) using a tone conversion curve f( ) to generate an image f(Org(x, y)) after tone conversion.

Note that (x, y) indicates the position (coordinates) of a pixel on the image.

This image f(Org(x, y)) undergoes the processes in steps S214 and S216 to acquire coefficients of a plurality of frequency bands (subbands) including high-frequency coefficient groups HL, LH, and HH.

Step S614:

The noise analysis circuit 1116 checks based on the values of the acquired high-frequency coefficient groups HL, LH, and HH if each high-frequency coefficient is noise.

In a practical method, a predetermined threshold value is set for each of three subbands HL, LH, and HH as in the process in step S202 shown in FIG. 2.

The noise analysis circuit 1116 executes a threshold value process for high-frequency coefficients HL, LH, and HH on the basis of the set threshold values. More specifically, the circuit 1116 executes the threshold value process in the same manner as in the process shown in FIG. 4. The circuit 1116 then determines a pixel (objective coefficient) to be processed by the frequency coefficient conversion circuit 1117 on the basis of that threshold value process results. That is, the circuit 1116 determines that a pixel (coefficient) of each subband corresponding to pixels having a pixel value "1" in all binary images of the subbands based on the threshold value processes is noise, and saves the position information of that coefficient (noise determination information) in the main memory 109.

Step S615:

The frequency coefficient conversion circuit 1117 executes the following process as a coefficient conversion process for reducing noise.

The relationship between density Y and cutoff width W determined by FIG. 18 is given by:

$$W=H(Y) \qquad (17)$$

The relationship between pixel value X and density Y in the tone conversion curve settled as described above is given by Y=F(x) from equation (14). Therefore, the relationship between cutoff width W and pixel value is described by:

$$W=H(F(x)) \qquad (18)$$

The frequency coefficient conversion circuit 1117 converts a coefficient corresponding to noise based on the noise determination information saved in the main memory 109 using the coefficient conversion curve shown in FIG. 17. In this case, cutoff width W is changed based on pixel value x at a coordinate position of the original image corresponding to that of the coefficient.

Step S218:

The restoration circuit 117 executes an inverse discrete wavelet transformation process for the coefficients processed by the frequency coefficient conversion circuit 116 to generate a noise-reduced image, as in the process in step S206 shown in FIG. 2.

As described above, according to the sixth embodiment, since the contents of the noise reduction process are determined based on the density value level of an output image (visible image), an identical processing effect can be obtained for a given density value level. Since the contents of the noise reduction process are related to the pixel value via the tone conversion curve, the noise reduction effect can be easily stabilized even when the tone conversion curve has been changed. This means that a constant processing effect can take place for a given density. When the cutoff width is changed in accordance with information of a portion to be photographed of the object, photographing information (photographing condition), and the like, more appropriate noise removal effect can be obtained.

<Seventh Embodiment>

Figure 19:
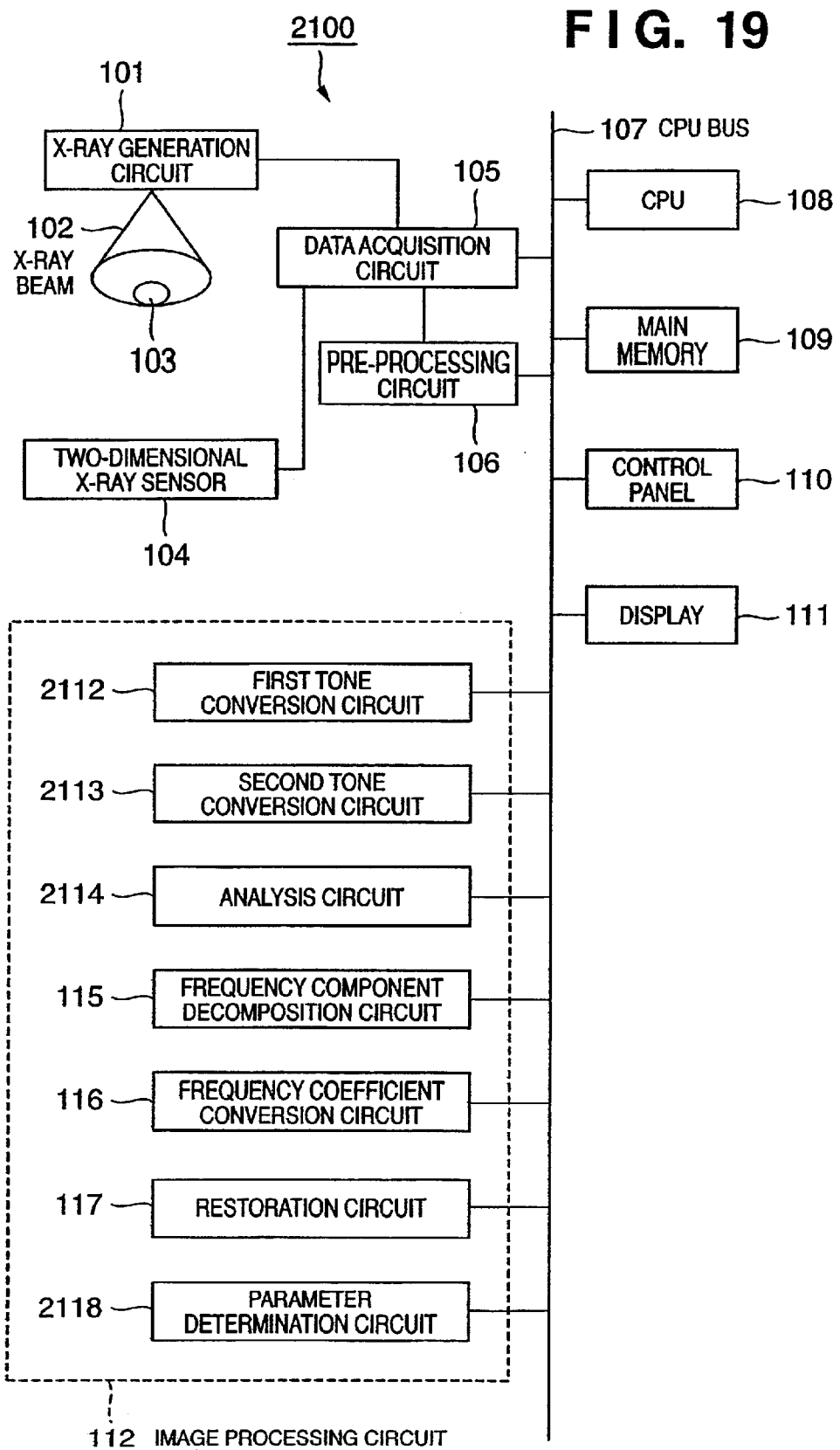
FIG. 19 is a block diagram showing the arrangement of an X-ray photography apparatus according to the seventh embodiment of the present invention.

The present invention is applied to an X-ray apparatus 2100 shown in, e.g., FIG. 19.

Note that the same reference numerals in the X-ray photography apparatus 2100 of the seventh embodiment denote the same parts as those in the X-ray photography apparatus 100 shown in FIG. 1, and a detailed description thereof will be omitted.

In the image processing circuit 112, a first tone conversion circuit 2112 generates a first tone conversion curve used in tone conversion of an original image, and executes tone conversion of the original image using the first tone conversion curve.

A second tone conversion circuit 2113 generates a second tone conversion curve used to change the dynamic range on the basis of the first tone conversion curve generated by the first tone conversion circuit 2112, and executes tone conversion of an image using the second tone conversion curve.

An analysis circuit 2114 analyzes the relationship between the pixel value of the original image and degree of change in frequency coefficient on the basis of the slope of the second tone conversion curve generated by the second tone conversion circuit 2113.

A parameter determination circuit 2118 displays the first tone conversion curve generated by the first tone conversion circuit 2112 and an image that has undergone tone conversion using the first tone conversion curve on the display 111 in advance, and determines parameters of the first and second tone conversion curves. In addition, the parameter determination circuit also serves as an input circuit for inputting various parameters for changing the shape of the tone conversion curve.

Figure 20:
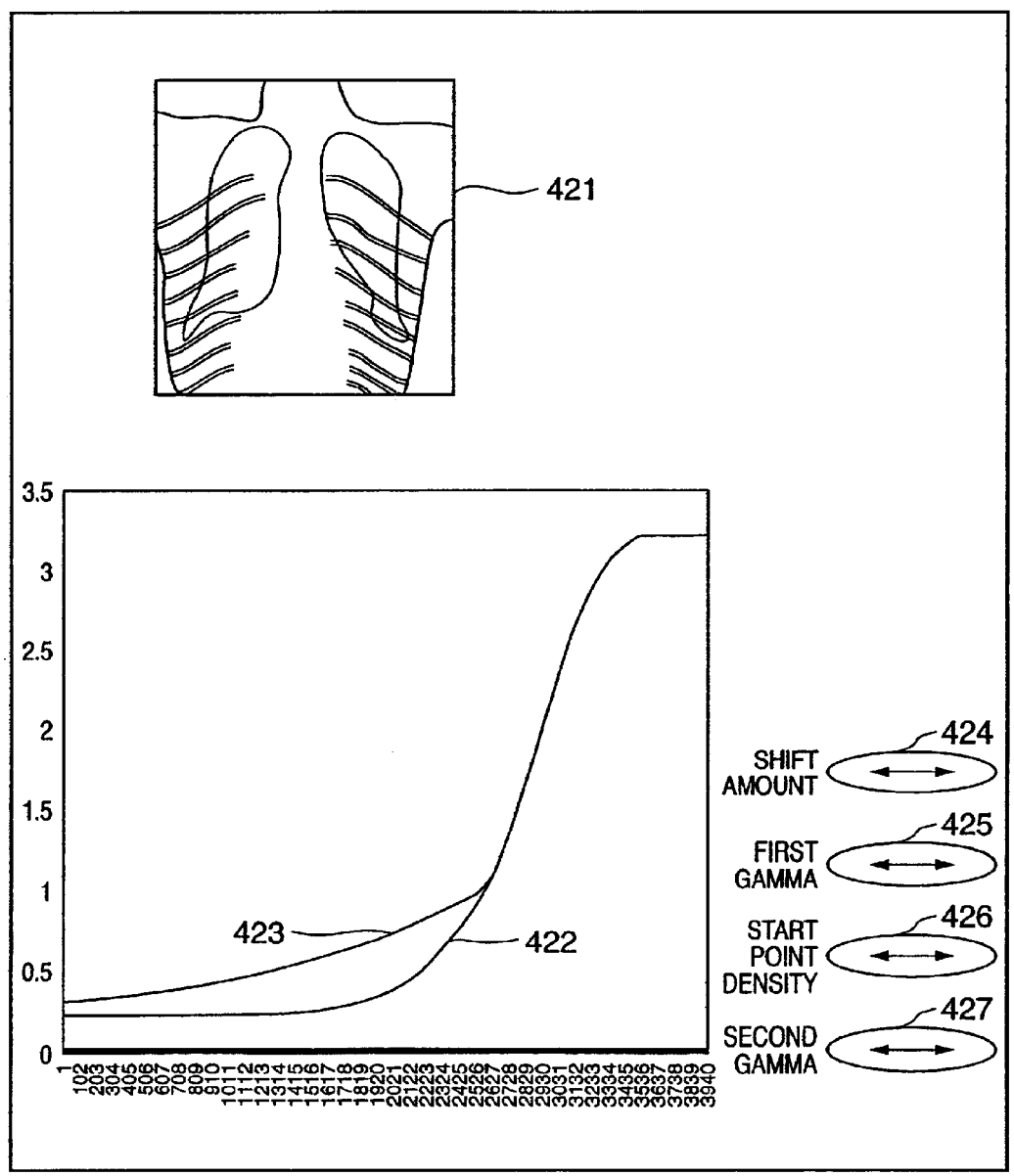
FIG. 20 shows a display example on a display according to the seventh embodiment of the present invention.

FIG. 20 shows a display example on the display 111. In this display example, reference numeral 421 denotes an image after an image process of an objective image. Reference numeral 422 denotes a first tone conversion curve form generated by the first tone conversion circuit 2112. Reference numeral 423 denotes a combined tone conversion curve obtained by combining the second tone conversion curve form generated by the second tone conversion circuit 2113 with the first tone conversion curve form. Reference numeral 424 denotes a shift unit for inputting a shift amount upon translating the first tone conversion curve form, i.e., shifting the pixel value corresponding to a given density value (i.e., shifting the entire tone conversion curve along the abscissa). Reference numerals 425 and 427 denote first and second slope change units for changing the values (gamma values) used to change the slopes of the first and second tone conversion curve forms. Reference numeral 426 denotes an instruction unit for instructing a density value (start point density) as a start point of a change in slope of the second tone conversion curve. A pixel value corresponding to this density value is calculated from the first tone conversion curve, and the second tone conversion curve form is changed based on the calculated pixel value.

Figure 21:
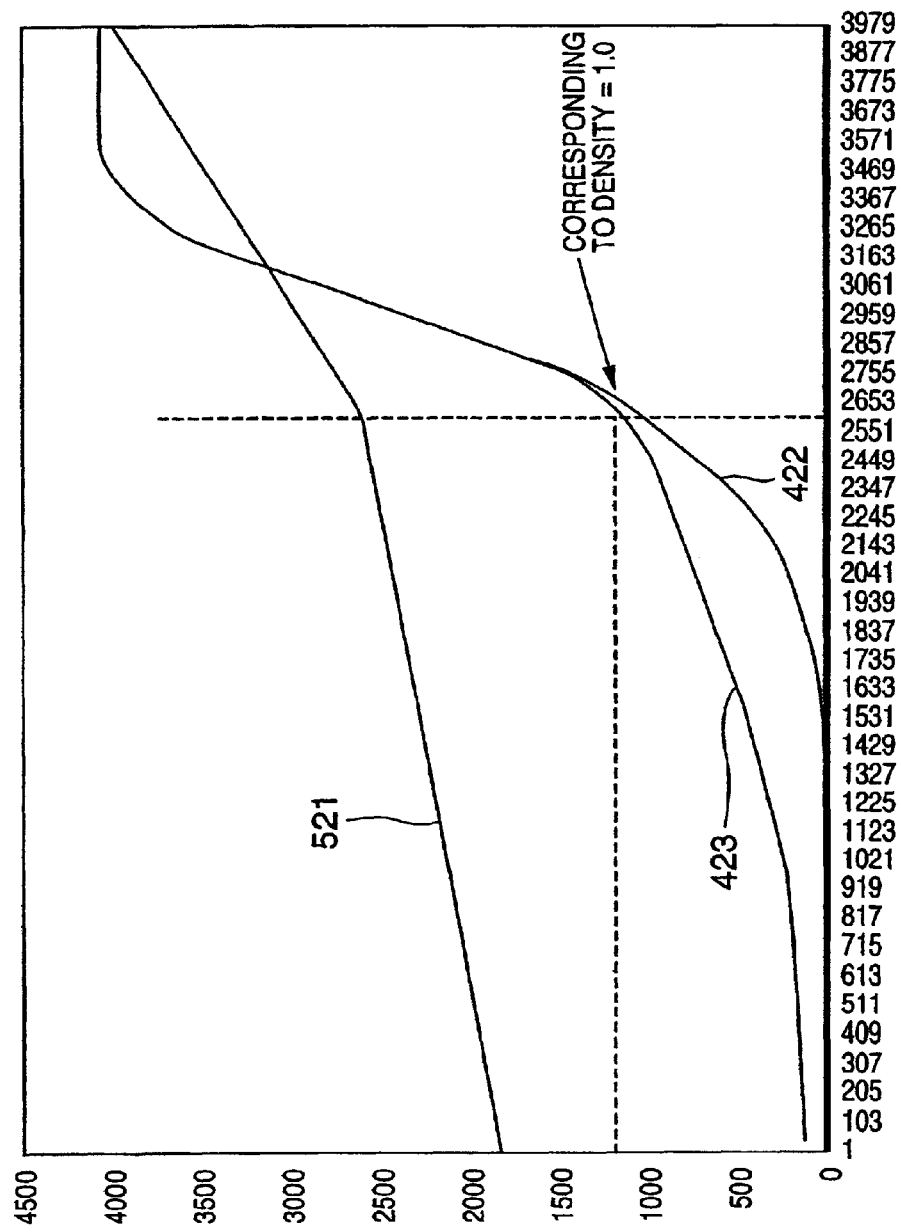
FIG. 21 is a graph showing the relationship between the first and second tone conversion curves according to the seventh embodiment of the present invention.

FIG. 21 shows the relationship between the first and second tone conversion curves.

Referring to FIG. 21, reference numeral 521 denotes a second tone conversion curve generated by the second tone conversion circuit 2113. This curve is generated to have a slope of a pixel value region equal to or smaller than a pixel value, which corresponds to the start point density=1.0 input by the instruction unit 426, in accordance with the slope input by the change unit 427.

Figure 22:
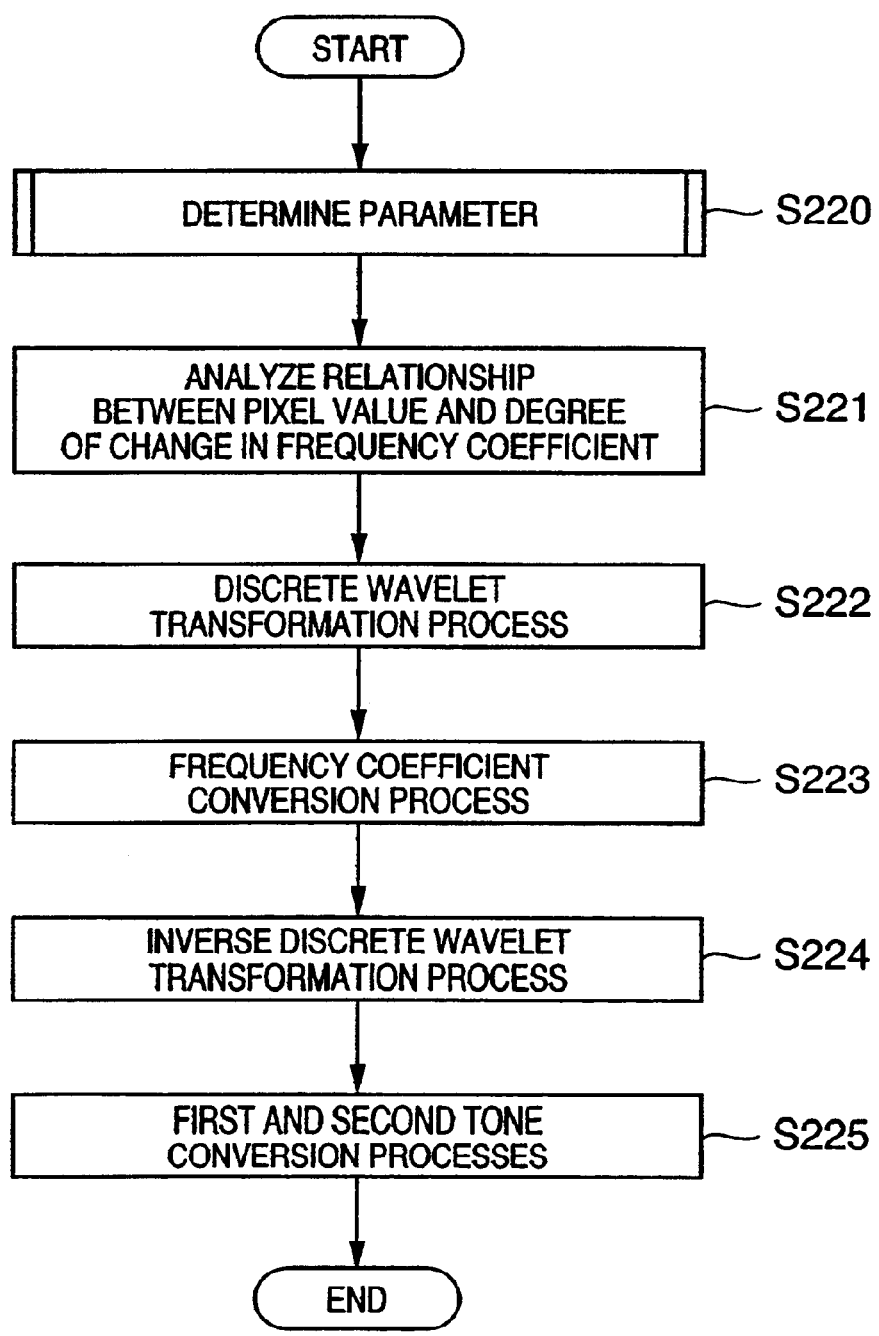
FIG. 22 is a flow chart showing the operation of the X-ray photography apparatus according to the seventh embodiment of the present invention.

FIG. 22 is a flow chart showing the operation of the X-ray photography apparatus according to the seventh embodiment of the present invention.

Figure 23:
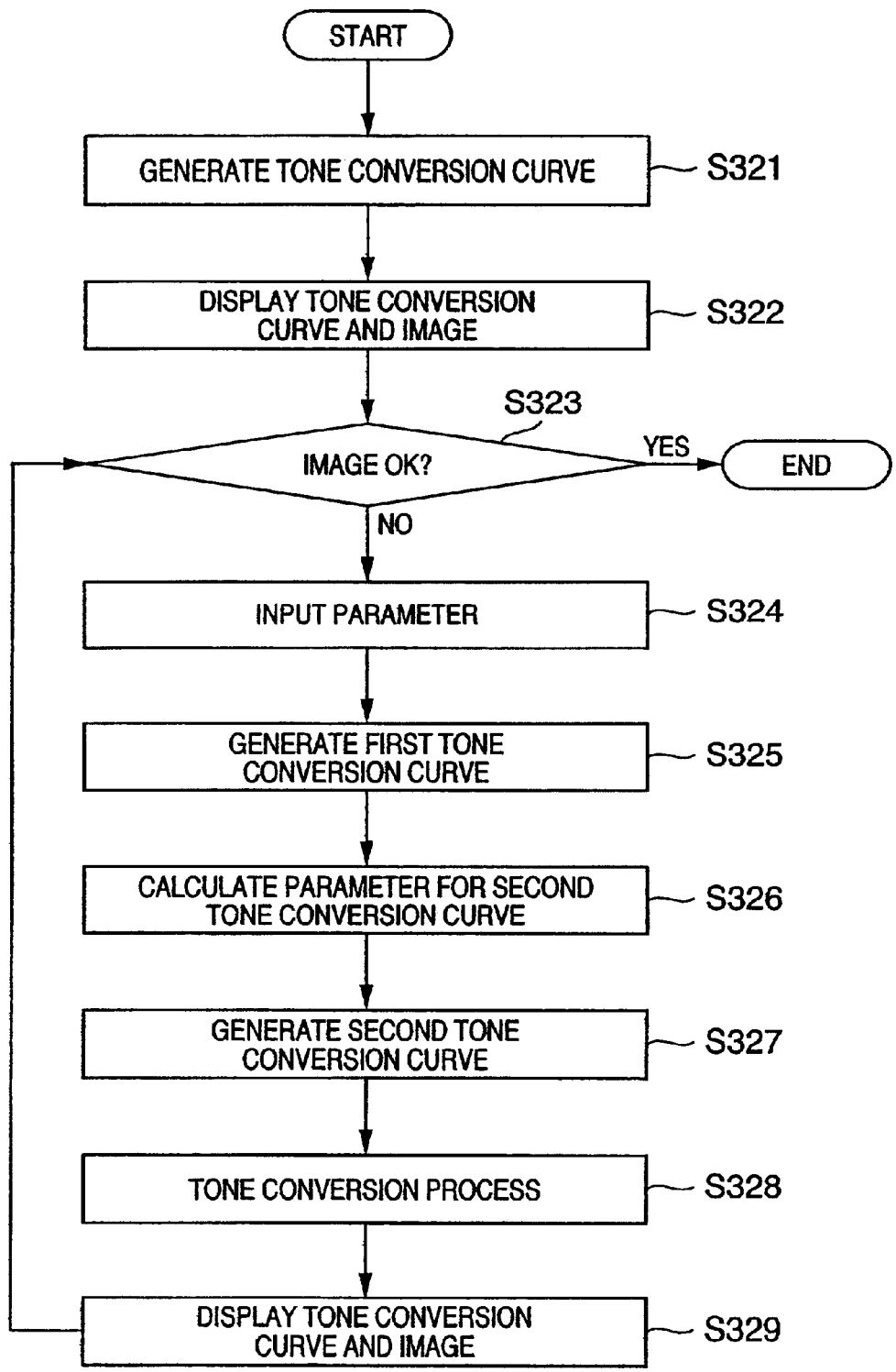
FIG. 23 is a flow chart showing details of step S220 according to the seventh embodiment of the present invention.

Step S220:

The parameter determination circuit 2118 determines parameters of the first and second tone conversion curves. Details of this determination process will be described below using FIG. 23.

Step S321:

Upon receiving an original image f(x, y) that has been processed by the pre-processing circuit 106 via the CPU bus 107 under the control of the CPU 108, the first tone conversion circuit 2112 generates, in accordance with predetermined parameters, a first tone conversion curve F( ) given by:

$$P(x, y) = F(f(x, y)) \quad (19)$$

Also, the second tone conversion circuit 2113 generates a second tone conversion curve F1( ) given by:

$$P(x, y) = F(F1(f(x, y))) \quad (20)$$

where f(x, y) is the pixel value of the original image, and x and y are the coordinates on the original image. P(x, y) is the density value of an image after the tone conversion process. Assume that the first tone conversion curve F( ) has a curve form 422 shown in FIG. 20, and the second tone conversion curve F1( ) has a curve form 521 shown in FIG. 21.

Note that the first tone conversion curve F( ) is generated using initial parameters and the feature amount obtained by an analysis unit (not shown) that analyzes the pixel value feature amount of an object image.

On the other hand, the second tone conversion curve is analytically determined based on the initial parameters after the first tone conversion curve is determined. The first tone conversion curve specifies a relationship between the pixel and density values of the original image, and the second tone conversion curve is determined based on this relationship and initial values. For example, when the dynamic range of the original image, which corresponds to density≦1.0, is to be changed, as shown in FIG. 21, the second tone conversion curve 521 is determined to change the dynamic range of a pixel value region equal to or lower than a pixel value corresponding to density=1.0, which is determined by the first tone conversion curve 422.

Step S322:

The display 111 displays an image P(x, y) after the tone conversion process, and this image is denoted by, e.g., 421 in FIG. 20. Furthermore, the display 111 displays the shift unit 424, first slope change unit 425, start point density instruction unit 426, and second slope change unit 427, as a graphical user interface, which is used to input parameters.

Step S323:

The CPU 108 checks the presence/absence of the operator's input for changing the tone conversion process of the original image. If no change input is detected, the processing ends, and the flow advances to step S221 in FIG. 22. On the other hand, if a change input is detected, the flow advances to step S324.

Step S324:

When the operator wants to change the tone conversion process contents, he or she inputs desired parameters via the shift unit 424, first slope change unit 425, start point density instruction unit 426, and second slope change unit 427. The change contents are accepted by the parameter determination circuit 2118.

Step S325:

The first tone conversion circuit 2112 changes the shape of the first tone conversion curve based on the input parameters to generate a new first tone conversion curve.

Step S326:

The second tone conversion circuit 2113 calculates parameters for generating the second tone conversion curve on the basis of the input parameters and the generated first tone conversion curve.

Step S327:

The second tone conversion circuit 2113 generates the second tone conversion curve given by equation (20) in accordance with the calculated parameters.

Step S328:

The first and second tone conversion circuits 2112 and 2113 sequentially execute tone conversion processes of an objective image using the first and second tone conversion curves.

Step S329:

The display 111 displays a new image P(x, y) after the tone conversion process. At this time, the changed tone conversion curve is also displayed as in FIG. 20.

Note that the parameter determination process in step S220 is made for the purpose of observing the density characteristics of a processed image. Hence, an image to be displayed need not have the same size as the original image, but may have the smallest possible size that allows satisfactory density adjustment. Also, the frequency process such as high-frequency emphasis upon compression of the dynamic range need not always be executed for the same reason as above.

In this way, the calculation time can be shortened, and parameters can be easily adjusted.

The description will revert to FIG. 22.

Step S221:

The analysis circuit 2114 analyzes the relationship between a pixel value f(x, y) of the original image and the degree of change in frequency coefficient. More specifically, the circuit 2114 calculates a coefficient C(x, y) as a degree of change in frequency coefficient (change degree: to be described later) by:

$$C(x, y)=(1/F1'(f(x, y))) \qquad (21)$$

Step S222:

The frequency component decomposition circuit 115 executes a two-dimensional discrete wavelet transformation process for an original image f(x, y) as in the process in step S201 shown in FIG. 2 to acquire coefficients of a plurality of frequency bands (subbands).

Step S223:

The frequency coefficient conversion circuit 116 converts a coefficient for each frequency band by multiplying a high-frequency coefficient by C(x, y), which is analytically obtained using equation (21), by:

$$h2n(x, y)=C(x, y) \times hn(x, y) \qquad (22)$$

where hn(x, y) is the frequency coefficient of level n, and h2n(x, y) is the coefficient value after coefficient conversion of hn(x, y).

By changing the high-frequency coefficients in this manner, the same contrast of a microstructure as in the original image can be maintained even in an image, the dynamic range of which has been changed. Note that the strength upon changing the frequency coefficients can be adjusted, since the right-hand side of equation (22) can be multiplied by an adjustable coefficient. Also, the second tone conversion curve is determined based on the first tone conversion curve, which determines the density value level of an original image, and the frequency coefficients are changed based on the slope of the second tone conversion curve. Hence, a pixel value region which is to undergo a frequency process (which means to change frequency coefficients) can be set in correspondence with the density value level.

Step S224:

The restoration circuit 117 executes an inverse discrete wavelet transformation process for the frequency coefficients processed by the frequency coefficient conversion circuit 116 to generate a restored image f2(x, y), as in the process in step S206 shown in FIG. 2.

Step S225:

The first and second tone conversion circuits 2112 and 2113 generate an image f3(x, y) after the tone conversion process by executing a tone conversion process for the restored image f2(x, y) according to:

$$f3(x, y)=F(F1(f2(x, y))) \qquad (22a)$$

Note that the order of tone conversion processes may be reversed to that described above.

In the above method, the slope of the tone conversion curve is changed for a pixel value region corresponding to the start point density or less. Also, the slope of the tone conversion curve can be changed for a pixel value region corresponding to the start point density or more by the same method.

As described above, according to the seventh embodiment, since a combined curve of the first tone conversion curve and the second tone conversion curve which changes the dynamic range is displayed, the relationship between the tone conversion process and dynamic range change process can be easily recognized. Also, parameters used to change the dynamic range can be easily adjusted, and the dynamic range can be changed appropriately.

Since the parameters of the first and second tone conversion curves can be freely changed, the curve forms of the first and second tone conversion curves can be desirably changed, and a pixel value range where the dynamic range is to be changed, and the degree of change can also be desirably changed.

Since the second tone conversion curve is determined based on the first tone conversion curve, which determines the density value level of an image after the tone conversion process (visible image), and the frequency coefficients are changed based on the slope of the second tone conversion curve, a pixel value region which is to undergo the frequency process can be set in correspondence with the density value level, and the frequency process can be executed in accordance with the density value level.

<Eighth Embodiment>

The eighth embodiment relates to a frequency process and noise removal process with reference to the pixel density of an output image (visible image) (film density, CRT luminance, or the like). More specifically, this embodiment provides a combined processing system of a high-frequency emphasis process, noise removal process, and the like, which are not influenced by a change in film density, CRT luminance, or the like upon executing a dynamic range change process.

Note that the eighth embodiment has an arrangement in the analysis circuit 2114 different from that of the seventh embodiment (FIG. 19).

Figure 24:
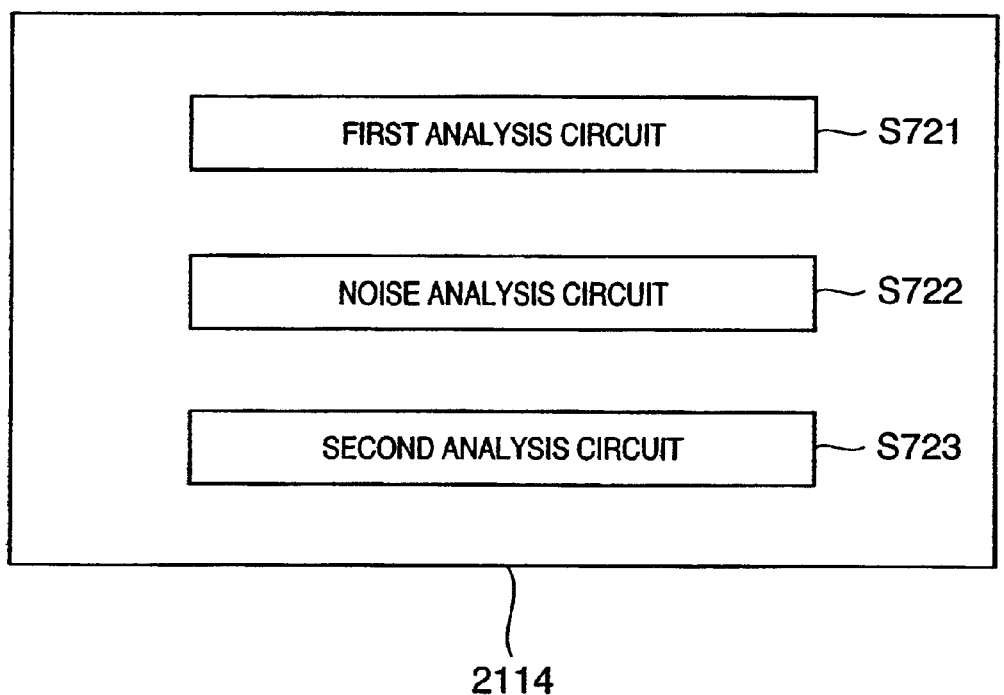
FIG. 24 is a diagram showing the detailed arrangement of an analysis circuit according to the eighth embodiment of the present invention.

FIG. 24 shows the detailed arrangement of the analysis circuit 2114 of the eighth embodiment.

In the analysis circuit 2114 shown in FIG. 24, a first analysis circuit 721 obtains the relationship between the pixel value of an image and the change degree of a frequency coefficient on the basis of the slope of the second tone conversion curve. A noise analysis circuit 722 analyzes based on the value of a frequency coefficient if that coefficient is noise. A second analysis circuit 723 changes a predetermined pattern which specifies the relationship between the density and the strength of the frequency process effect, and a predetermined pattern which specifies the relationship between the density and the strength of the noise removal effect into a pattern which specifies the relationship between the pixel value and these effects via the first and second tone conversion curves.

Figure 25:
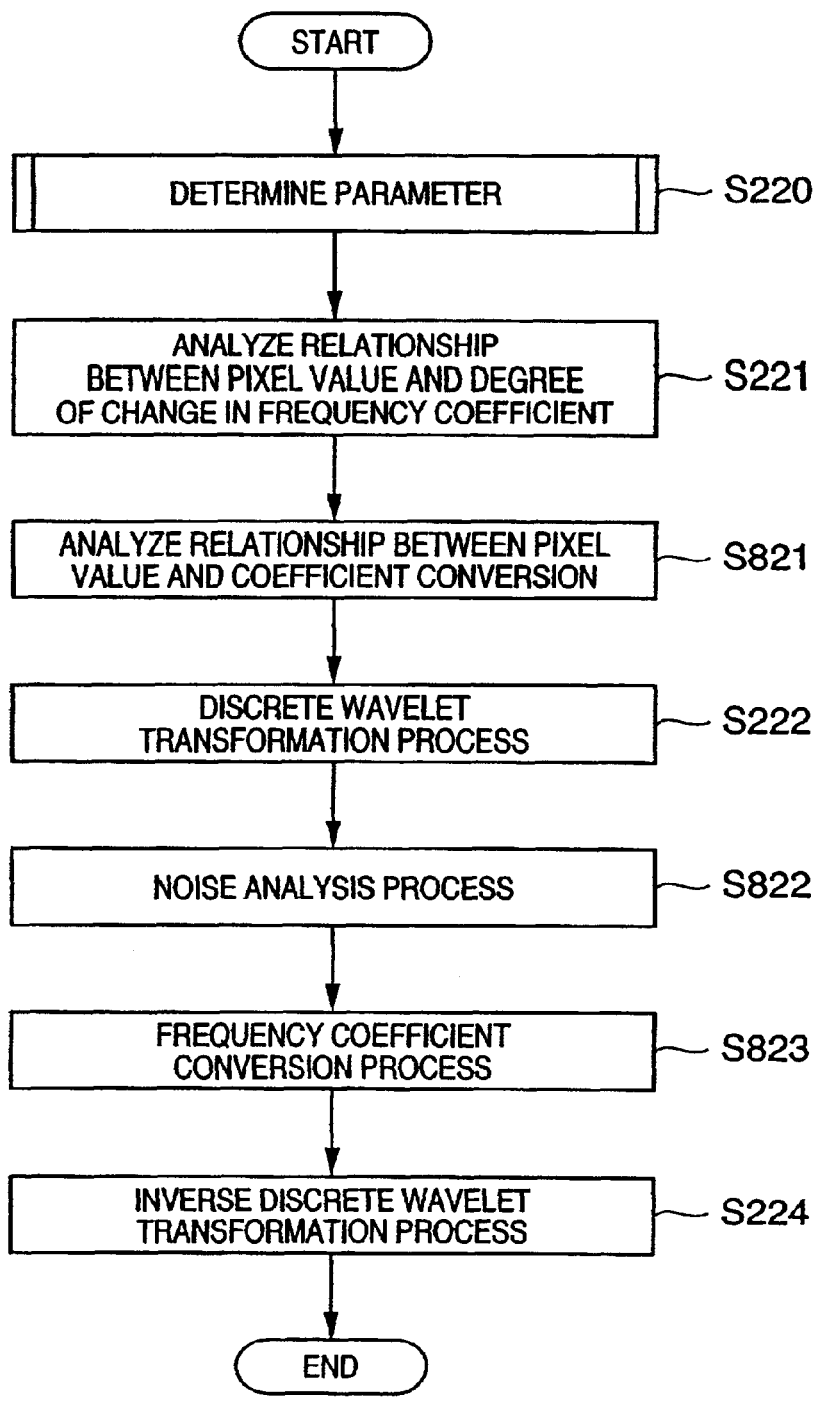
FIG. 25 is a flow chart showing the operation of an X-ray photography apparatus according to the eighth embodiment of the present invention.

FIG. 25 is a flow chart showing the operation of the X-ray photography apparatus according to the eighth embodiment of the present invention.

Step S220:

The parameter determination circuit 2118 determines parameters of the first and second tone conversion curves as in the process in step S220 shown in FIG. 22.

Step S221:

The first analysis circuit 721 in the analysis circuit 2114 analyzes the relationship between a pixel value f(x, y) of an original image and the change degree of a frequency coefficient as in the process in step S221 shown in FIG. 22.

Step S821:

The second analysis circuit 723 in the analysis circuit 2114 makes analysis for changing the relationship between the pixel value f(x, y) of the original image and coefficient conversion on the basis of the reference coefficient conversion pattern 301 (FIG. 13), and the combined tone conversion curve 423 (FIG. 21) of the tone conversion curves generated by the first and second tone conversion circuits 2112 and 2113.

More specifically, a curve form that indicates the relationship between the density value and change magnification B(x, y) of a coefficient shown in FIG. 13 is given by:

$$B(x, y)=H(P) \tag{23}$$

where (x, y) is the coordinate position of an image, and P is the density value.

The seventh embodiment can provide the relationship given by:

$$P(x, y)=F(F1(f(x, y))) \tag{24}$$

Hence, the second analysis circuit 723 calculates a change magnification B(x, y) of a frequency coefficient by:

$$B(x, y)=H(F(F1(f(x, y)))) \tag{25}$$

and saves it in the memory 109.

A curve form indicating the relationship between cutoff width W(x, y) and density value P in FIG. 17 is given by:

$$W(x, y)=H2(P) \tag{26}$$

Hence, the second analysis circuit 723 calculates a cutoff width W(x, y) by:

$$W(x, y)=H2(F(F1(f(x, y)))) \tag{27}$$

and saves it in the memory 109.

Step S222:

The frequency component decomposition circuit 115 executes a two-dimensional discrete wavelet transformation process for an image as in the process in step S201 shown in FIG. 2 to acquire coefficients of a plurality of frequency bands.

Step S822:

The noise analysis circuit 722 checks based on the values of the acquired high-frequency coefficients HL, LH, and HH if that high-frequency coefficient is noise.

In a practical method, an arbitrary threshold value is set for each of three subbands, i.e., high-frequency coefficients HL, LH, and HH as in the process in step S206 shown in FIG. 2.

The noise analysis circuit 722 executes a threshold value process for high-frequency coefficients HL, LH, and HH on the basis of the set threshold values. More specifically, the circuit 722 executes the threshold value process in the same manner as in the process shown in FIG. 3. The circuit 722 then determines a pixel (objective coefficient) to be processed by the frequency coefficient conversion circuit 1117 on the basis of that threshold value process. More specifically, the circuit 722 determines that a pixel (coefficient) of each subband corresponding to pixels having a pixel value "1" in binary images of respective subbands is noise, and calculates the average value of coefficients around that coefficient. The circuit 722 then saves the calculated average value and its position information (noise determination information) in the main memory 109.

Step S823:

The frequency coefficient conversion circuit 116 converts frequency coefficients. Note that the coefficient conversion curve form shown in FIG. 17 is described by:

$$k1(x, y)=H3(k(x, y)) \tag{28}$$

where k(x, y) is the frequency coefficient corresponding to the coordinate position (x, y), and k1(x, y) is the converted frequency coefficient.

The frequency coefficient conversion circuit 116 then executes frequency coefficient conversion described by:

$$k2(x, y)=C(x, y) \times H(F(F1(f(x, Y)))) \times H3(k(x, y)) \tag{29}$$

for noise components analyzed by the noise analysis circuit 722. Also, the circuit 116 executes frequency coefficient conversion described by:

$$k3(x, y)=C(x, y) \times H(F(F1(f(x, y)))) \times k(x, y) \tag{30}$$

for components other than noise components.

Step S224:

The restoration circuit 117 executes an inverse discrete wavelet transformation process for the frequency coefficients processed by the frequency coefficient conversion circuit 116 to generate an image, as in the process in step S206 shown in FIG. 2.

As described above, according to the eighth embodiment, a plurality of processes such as a dynamic range change process, noise removal process, sharpening process, and the like can be done depending on the density or luminance value of an output image (visible image). For this reason, a constant processing effect can be obtained for a given density value or luminance value level without being influenced by a change in density or luminance value.

Since the noise removal process and sharpening process are appropriately executed in combination after an image is decomposed into frequency bands, the noise removal process and sharpening process can be efficiently executed without any conflicting effects. Since the dynamic range change process and sharpening process are appropriately executed in combination, the influences of these processes do not interfere with each other, and the image quality can be prevented from deteriorating. Also, since the noise removal process, sharpening process, and dynamic range change process are appropriately executed in combination, these processes can be executed without any interference, the purposes of these objects can be achieved, and the image quality of an image that has undergone the combined processes can be improved. Furthermore, since repetitive processes for the frequency processes are avoided, the calculation time can be shortened.

Note that the objects of the present invention are also achieved by supplying a storage medium, which records a program code of a software program that can implement the functions of the above-mentioned first to eighth embodiments to the system or apparatus, and reading out and executing the program code stored in the storage medium by a computer (CPU, MPU, or the) of the system or apparatus.

In this case, the program code itself read out from the storage medium implements the functions of the above-mentioned first to eighth embodiments, and the storage medium which stores the program code constitutes the present invention.

As the storage medium for supplying the program code, for example, a ROM, floppy (tradename) disk, hard disk, optical disk, magneto-optical disk, CD-ROM, CD-R, magnetic tape, nonvolatile memory card, and the like may be used.

The functions of the above-mentioned first to eighth embodiments may be implemented not only by executing the readout program code by the computer but also by some or all of actual processing operations executed by an OS running on the computer on the basis of an instruction of the program code.

Furthermore, the functions of the above-mentioned first to eighth embodiments may be implemented by some or all of actual processing operations executed by a CPU or the like arranged in a function extension board or a function extension unit, which is inserted in or connected to the computer, after the program code read out from the storage medium is written in a memory of the extension board or unit.

Figure 26:
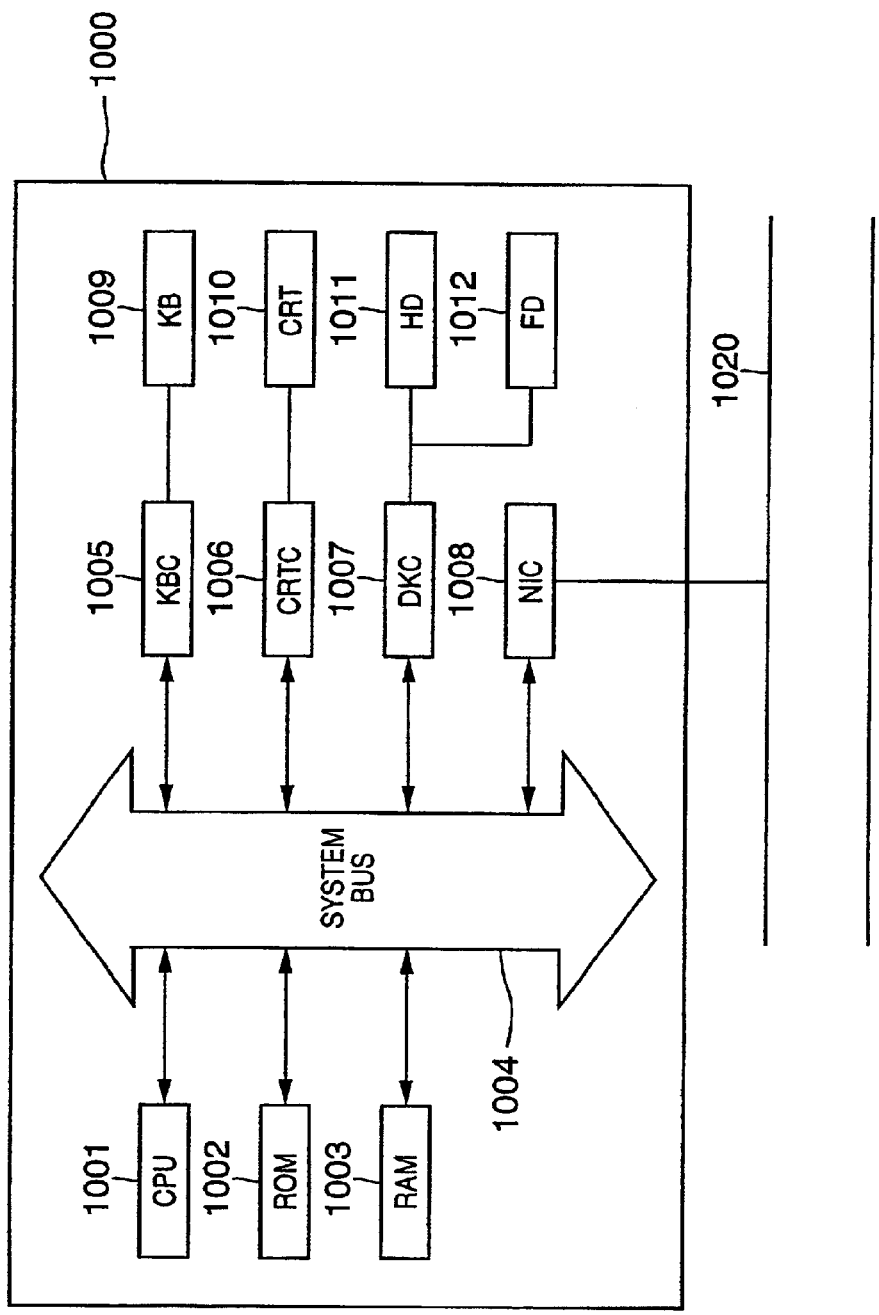
FIG. 26 is a block diagram showing the arrangement of a computer which reads out a program for making that computer implement the functions of the X-ray photography apparatus of the present invention from a storage medium, and executes the readout program.

FIG. 26 shows the arrangement of a computer function 1000.

The computer function 1000 comprises a CPU 1001, a ROM 1002, a RAM 1003, a keyboard controller (KBC) 1005 for making control associated with a keyboard (KB) 1009, a CRT controller (CRTC) 1006 for making control associated with a CRT display (CRT) 1010 as a display unit, a disk controller (DKC) 1007 for making control associated with a hard disk (HD) 1011 and floppy (tradename) disk (FD) 1012, and a network interface controller (NIC) 1008 used to establish connection to a network 1020, which are connected via a system bus 1004 to be able to communicate with each other.

The CPU 1001 systematically controls the respective building components connected to the system bus 1004 by executing software stored in the ROM 1002 or HD 1011 or software supplied from the FD 1012.

More specifically, the CPU 1001 makes control for implementing the operations of the first to eighth embodiments by reading out and executing a processing program according to a predetermined processing sequence from the ROM 1002, HD 1011, or FD 1012.

The RAM 1003 serves as a main memory, work area, or the like of the CPU 1001. The KBC 1005 makes control associated with instruction inputs from the KB 1009, a pointing device (not shown), and the like. The CRTC 1006 makes control associated with display on the CRT 1010.

The DKC 1007 makes control associated with access to the HD 1011 and FD 1012, which store a boot program, various applications, edit files, user files, a network management program, a predetermined processing program, and the like.

The NIC 1008 exchanges data in two ways with another apparatus or system on the network 1020.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for executing a plurality of image processes on an objective image, said apparatus comprising:
   a decomposition unit for decomposing the objective image into components of a plurality of frequency bands;
   an analysis unit for analyzing the components obtained by said decomposition unit with respect to each of the plurality of image processes;
   a component conversion unit for converting the components obtained by said decomposition unit on the basis of analysis results of said analysis unit; and
   an image generation unit for generating an image from the components of the plurality of frequency bands converted by said component conversion unit,
   wherein the plurality of image processes include at least two of a noise removal process, a sharpening process, and a dynamic range change process.

2. The apparatus according to claim 1, wherein the objective image includes an image taken by radiography.

3. An image processing apparatus for executing a plurality of image processes on an objective image, said apparatus comprising:
   a decomposition unit for decomposing the objective image into components of a plurality of frequency bands;
   an analysis unit for analyzing the components obtained by said decomposition unit with respect to each of the plurality of image processes on the basis of information of a pixel value level of a visible image obtained via the plurality of image processes for the objective image;
   a component conversion unit for converting the components obtained by said decomposition unit on the basis of analysis results of said analysis unit; and
   an image generation unit for generating an image from the components of the plurality of frequency bands converted by said component conversion unit,
   wherein the plurality of image processes include at least two of noise removal processing, a sharpening processing, and a dynamic range change processing.

4. The apparatus according to claim 3, wherein the objective image includes an image taken by radiography.

5. The apparatus according to claim 3, further comprising:
   a tone conversion unit for converting an input pixel value into a pixel value of the visible image, and
   wherein said component conversion unit converts the components obtained by said decomposition unit on the basis of tone conversion characteristics of said tone conversion unit.

6. The apparatus according to claim 5, wherein said component conversion unit converts the components obtained by said decomposition unit on the basis of the tone conversion characteristics and pattern information which specifies a relationship between the pixel value level and component conversion characteristics of said component conversion unit.

7. The apparatus according to claim 3, wherein said component conversion unit has a noise removal function, and
   said component conversion unit changes a cutoff width of a efficient conversion curve for noise removal on the basis of the information of the pixel value level.

8. The apparatus according to claim 6, wherein the objective image is an image taken by radiography of an object, and
   the pattern information is determined based on at least one information of a portion to be radiographed of the object and a condition of the radiography.

9. The apparatus according to claim 5, further comprising:
   a change unit for changing the tone conversion characteristics.

10. An image processing apparatus for executing an image process on an objective image, said apparatus comprising:
    a decomposition unit for decomposing the objective image into components of a plurality of frequency bands;
    a component conversion unit for converting the components obtained by said decomposition unit on the basis of information of a pixel value level of a visible image obtained via the image processing for the objective image;
    an image generation unit for generating an image from the components of the plurality of frequency bands converted by said component conversion unit; and a tone conversion unit for converting an input pixel value into a pixel value of the visible image, wherein said component conversion unit converts the components obtained by said decomposition unit on the basis of tone conversion characteristics of said tone conversion unit.

11. The apparatus according to claim 10, wherein said component conversion unit converts the components obtained by said decomposition unit on the basis of the tone conversion characteristics and pattern information which specifies a relationship between the pixel value level and component conversion characteristics of said component conversion unit.

12. The apparatus according to claim 10, wherein said component conversion unit has a noise removal function, and said component conversion unit changes a cutoff width of a coefficient conversion curve for noise removal on the basis of the information of the pixel value level.

13. The apparatus according to claim 11, wherein said objective image is an image taken by radiography of an object, and the pattern information is determined based on at least one information of a portion to be radiographed of the object and a condition of the radiography.

14. The apparatus according to claim 10, further comprising:

a change unit for changing the tone conversion characteristic.

15. An image processing system formed by connecting a plurality of apparatuses for executing a plurality of image processes on an objective image, said system comprising:

a decomposition unit for decomposing the objective image into components of a plurality of frequency bands;

an analysis unit for analyzing the components obtained by said decomposition unit with respect to each of the plurality of image processes;

a component conversion unit for converting the components obtained by said decomposition unit on the basis of analysis results of said analysis unit; and an image generation unit for generating an image from the components of the plurality of frequency bands converted by said component conversion unit, wherein the plurality of image processes includes at least two of a noise removal process, a sharpening process, and a dynamic range change process.

16. An image processing system formed by connecting a plurality of apparatuses for executing a plurality of image processes on an objective image, said system comprising:

a decomposition unit for decomposing the objective image into components of a plurality of frequency bands;

an analysis unit for analyzing the components obtained by said decomposition unit with respect to each of the plurality of image processes on the basis of information of a pixel value level of a visible image obtained via the plurality of image processes for the objective image;

a component conversion unit for converting the components obtained by said decomposition unit on the basis of analysis results of said analysis unit; and an image generation unit for generating an image from the components of the plurality of frequency bands converted by said component conversion unit, wherein the plurality of image processes include at least two of a noise removal process, a sharpening process, and a dynamic range change process.

17. An image processing system formed by connecting a plurality of apparatuses for executing an image processes on an objective image, said system comprising:

a decomposition unit for decomposing the objective image into components of a plurality of frequency bands;

a component conversion unit for converting the components obtained by said decomposition unit on the basis of information of a pixel value level of a visible image obtained via the image processing for the objective image;

an image unit for generating an image from the components of the plurality of frequency bands converted by said component conversion unit; and a tone conversion unit for converting an input pixel value into a pixel value of the visible image, wherein said component conversion unit converts the components obtained by said decomposition unit on the basis of tone conversion characteristics of said tone conversion unit.

18. A program executing a method of performing a plurality of image processes on an objective image, said program comprising:

code for a decomposition step, of decomposing the objective image into components of a plurality of frequency bands;

code for an analysis step, of analyzing the components obtained in said decomposition step with respect to each of the plurality of image processes;

code for a component conversion step, of converting the components obtained in said decomposition step on the basis of analysis results of said analysis step; and code for an image generation step, of generating an image from the components of the plurality of frequency bands converted in said component conversion step, wherein the plurality of image processes include at least two of a noise removal process, a sharpening process, and a dynamic range change process.

19. A program executing a method of performing a plurality of image processes on an objective image, said program comprising:

code for a decomposition step, of decomposing the objective image into components of a plurality of frequency bands;

code for an analysis step, of analyzing the components obtained in said decomposition step with respect to each of the plurality of image processes on the basis of information of a pixel value level of a visible image obtained via the plurality of image processes for the objective image;

code for a component conversion step, of converting the components obtained in said decomposition step on the basis of analysis results of said analysis step; and code for an image generation step, of generating an image from the components of the plurality of frequency bands converted in said component conversion step, wherein the plurality of image processes include at least two a noise removal process, a sharpening process, and a dynamic range change process.

20. A program executing a method of performing an image process on an objective image, said program comprising:

code for a decomposition step, of decomposing the objective image into components of a plurality of frequency bands;

code for a component conversion step, of converting the components obtained in said decomposition step on the basis of information of a pixel value level of a visible image obtained via the image process for the objective image;

code for an image generation step, of generating an image from the components of the plurality of frequency bands converted in said component conversion step; and code for a tone conversion step, of converting an input pixel value into a pixel value of the visible image, wherein said component conversion step includes converting the components obtained in said decomposition step on the basis of tone conversion characteristics of said tone conversion step.

21. A computer readable storage medium which stores a program executing a method of performing a plurality of image processes on an objective image, said program comprising:

code for a decomposition step, of decomposing the objective image into components of a plurality of frequency bands;

code for an analysis step, of analyzing the components obtained in said decomposition step with respect to each of the plurality of image processes;

code for a component conversion step, of converting the components obtained in said decomposition step on the basis of analysis results of said analysis step; and code for an image generation step, of generating an image from the components of the plurality of frequency bands converted in said component conversion step, wherein the plurality of image processes include at least two a noise removal process, a sharpening process, and a dynamic range change process.

22. A computer readable storage medium which stores a program executing a method of performing a plurality of image processes on an objective image, said program comprising:

code for a decomposition step, of decomposing the objective image into components of a plurality of frequency bands;

code for an analysis step, of analyzing the components obtained in said decomposition step with respect to each of the plurality of image processes on the basis of information of a pixel value level of a visible image, obtained via the plurality of image processes for the objective image;

code for a component conversion step, of converting the components obtained in said decomposition step on the basis of analysis results of said analysis step; and code for an image generation step, of generating an image from the components of the plurality of frequency bands converted in said component conversion step, wherein the plurality of image processes include at least two of a noise removal process, a sharpening process, and a dynamic range change process.

23. A computer readable storage medium which stores a program executing a method of performing an image process on an objective image, said program comprising:

code for a decomposition step, of decomposing the objective image into components of a plurality of frequency bands;

code for a component conversion step, of converting the components obtained in said decomposition step on the basis of information of a pixel value level of a visible image obtained via the image process on the objective image;

code for an image generation step, of generating an image from the components of the plurality of frequency bands converted in said component conversion step;

code for a tone conversion step, of converting an input pixel value into a pixel value of the visible image, wherein said component conversion step includes converting the components obtained in said decomposition step on the basis of tone conversion characteristics of said tone conversion step.

24. An image processing method of executing a plurality of image processes on an objective image, said method comprising:

a decomposition step, of decomposing the objective image into components of a plurality of frequency bands;

an analysis step, of analyzing the components obtained in said decomposition step with respect to each of the plurality of image processes;

a component conversion step, of converting the components obtained in said decomposition step on the basis of analysis results of said analysis step; and an image generation step, of generating an image from the components of the plurality of frequency bands converted in said component conversion step, wherein the plurality of image processes include at least two of a noise removal process, a sharpening process, and a dynamic range change process.

25. An image processing method of executing a plurality of image processes on an objective image, said method comprising:

a decomposition step, of decomposing the objective image into components of a plurality of frequency bands;

an analysis step, of analyzing the components obtained in said decomposition step with respect to each of the plurality of image processes on the basis of information of a pixel value level of a visible image obtained via the plurality of image processes on the objective image;

a component conversion step, of converting the components obtained in said decomposition step on the basis of analysis results of said analysis step; and an image generation step, of generating an image from the components of the plurality of frequency bands converted in said component conversion step, wherein the plurality of image processes include at least two of a noise removal process, a sharpening process, and a dynamic range change process.

26. An image processing method of executing an image process on an objective image, said method comprising:

a decomposition step, of decomposing the objective image into components of a plurality of frequency bands;

a component conversion step, of converting the components obtained in said decomposition step on the basis of information of a pixel value level of a visible image obtained via the image process on the objective image;

an image generation step, of generating an image from the components of the plurality of frequency bands converted in said component conversion step; and a tone conversion step, of converting an input pixel value into a pixel value of the visible image, wherein said component conversion step includes converting the components obtained in said decomposition step on the basis of tone conversion characteristics of said tone conversion step.

27. An image processing apparatus for executing a plurality of image processes on an objective image, said apparatus comprising:
- a decomposition unit, adapted to decompose the objective image into components of a plurality of frequency bands;
- a degree of change determination unit, adapted to determine degree of change which changes a value of the components corresponding to each of the plurality of image processes;
- a storage unit, adapted to store the degree of change;
- a determination unit, adapted to determine degree of conversion of the components on the basis of the degree of change stored in said storage unit;
- a component conversion unit, adapted to convert the value of the components on the basis of the degree of conversion; and
- an image generation unit, adapted to generate an image from the components of the plurality of frequency bands converted by said component conversion unit.

28. The apparatus according to claim 27, wherein the plurality of image processes include at least two of a noise removal process, a sharpening process, and a dynamic range change process.

29. An image processing apparatus for executing an image process for an objective image, said apparatus comprising:
- a storage unit, adapted to store information relating to a tone conversion curve;
- a decomposition unit, adapted to decompose the objective image into components of a plurality of frequency bands;
- a degree of change determination unit, adapted to determine degree of change which changes a value of the components on the basis of the information relating to the tone conversion curve;
- a component conversion unit, adapted to convert the value of the components on the basis of the degree of change; and
- an image generation unit, adapted to generate an image from the components of the plurality of frequency bands converted by said component conversion unit.

30. The apparatus according to claim 29, wherein the information relating to the tone conversion curve is at least one of information of a slope of the tone conversion curve and range information of input value defined by a range of a predetermined output value of the tone conversion curve.

31. The apparatus according to claim 29, wherein the degree of change is used for any one of a noise removal process, a sharpening process, or a dynamic range change process.

32. An image processing apparatus for executing a plurality of image processes for an objective image, said apparatus comprising:
- a first storage unit, adapted to store information relating to a tone conversion curve;
- a decomposition unit, adapted to decompose the objective image into components of a plurality of frequency bands;
- a degree of change determination unit, adapted to determine degree of change which changes a value of the components corresponding to each of the plurality of image processes on the basis of the information relating to the tone conversion curve;
- a second storage unit, adapted to store the degree of change;
- a determination unit, adapted to determine degree of conversion of the components on the basis of the degree of change stored in the second storage unit;
- a component conversion unit, adapted to convert the value of the components on the basis of the degree of conversion; and
- an image generation unit, adapted to generate an image from the components of the plurality of frequency bands converted by said component conversion unit.

33. The apparatus according to claim 32, wherein the plurality of image processes include at least two of a noise removal process, a sharpening process, and a dynamic range change process.

34. The apparatus according to claim 32, further comprising a tone conversion unit, adapted to execute the tone conversion process on the image generated by said image generation unit using the tone conversion curve stored in said first storage unit.

35. The apparatus according to claim 32, further comprising a change unit, adapted to change the information relating to the tone conversion curve.

36. The apparatus according to claim 35, wherein said change unit further comprises a display unit, adapted to display an image tone-converted by the tone conversion curve stored in said first storage unit.

37. An image processing apparatus for executing a plurality of image processes on an objective image, comprising:
- a tone conversion unit, adapted to tone-convert the objective image using a tone conversion curve;
- a decomposition unit, adapted to decompose the tone-converted objective image into components of a plurality of frequency bands;
- a degree of change determination unit, adapted to determine the components with respect to each of the plurality of image processes on the basis of information relating to the tone conversion curve;
- a storage unit, adapted to store the degree of change;
- a determination unit, adapted to determine degree of conversion on the basis of the degree of change stored in said storage unit;
- a component conversion unit, adapted to convert the components on the basis of the change of conversion; and
- an image generation unit, adapted to generate an image from the components of the plurality of frequency bands converted by said component conversion unit.

38. The apparatus according to claim 37, wherein the plurality of image processes include at least two of a noise removal process, a sharpening process, and a dynamic range change process.

39. An image processing apparatus to executing a plurality of image processes on an objective image, said apparatus comprising:
- a decomposition unit, adapted to decompose the objective image into components of a plurality of frequency bands;
- an analysis unit, adapted to extract a component of the plurality of frequency bands corresponding to a noise;
- a component conversion unit, adapted to convert the components corresponding to the noise into a component having a value calculated by values of surrounding components of the components corresponding to the noise; and an image generation unit, adapted to generate an image from the components of the plurality of frequency bands converted by said component conversion unit.

40. An image processing system for executing a plurality of image processes on an objective image, said system comprising:

a decomposition unit, adapted to decompose the objective image into components of a plurality of frequency bands;

a degree of change determination unit, adapted to determine a degree of change which changes a value of the components corresponding to each of the plurality of image processes;

a storage unit, adapted to store the degree of change;

a determination unit, adapted to determine degree of conversion of the components on the basis of the degree of change stored in said storage unit;

a component conversion unit, adapted to convert the value of the components on the basis of the degree of conversion; and an image generation unit, adapted to generate an image from the components of the plurality of frequency bands converted by said component conversion unit.

41. An image processing system for the executing an image process on an objective image, said system comprising:

a storage unit, adapted to store information relating to a tone conversion curve;

a decomposition unit, adapted to decompose the objective image into components of a plurality of frequency bands;

a degree of change determination unit, adapted to determine degree of change which changes a value of the components on the basis of the information relating to the tone conversion curve;

a component conversion unit, adapted to convert the value of the components on the basis of the degree of change; and an image generation unit, adapted to generate an image from the components of the plurality of frequency bands converted by said component conversion unit.

42. An image processing system for executing a plurality of image processes for an objective image, said system comprising:

a first storage unit, adapted to store information relating to a tone conversion curve;

a decomposition unit, adapted to decompose the objective image into components of a plurality of frequency bands;

a degree of change determination unit, adapted to determine degree of change which changes a value of the components corresponding to each of the plurality of image processes on the basis of the information relating to the tone conversion curve;

a second storage unit, adapted to store the degree of change;

a determination unit, adapted to determine degree of conversion of the components on the basis of the degree of change stored in the second storage unit;

a component conversion unit, adapted to convert the value of the components on the basis of the degree of conversion; and an image generation unit, adapted to generate an image from the components of the plurality of frequency bands converted by said component conversion unit.

43. An image processing system for executing a plurality of image processes on an objective image, said system comprising:

a tone conversion unit, adapted to tone-convert the objective image using a tone conversion curve;

a decomposition unit, adapted to decompose the tone-converted objective image into components of a plurality of frequency bands;

a degree of change determination unit, adapted to determine the components with respect to each of the plurality of image processes on the basis of information relating to the tone conversion curve;

a storage unit, adapted to store the degree of change;

a determination means, adapted to determine degree of conversion on the basis of the degree of change stored in said storage unit;

a component conversion unit, adapted to convert the components on the basis of the change of conversion; and an image generation unit, adapted to generate an image from the components of the plurality of frequency bands converted by said component conversion unit.

44. An image processing system for executing a plurality of image processes on an objective image, said system comprising:

a decomposition unit, adapted to decompose the objective image into components of a plurality of frequency bands;

an analysis unit, adapted to extract a component of the plurality of frequency bands corresponding to a noise;

a component conversion unit, adapted to convert the components corresponding to the noise into a component having a value calculated by values of surrounding components of the components corresponding to the noise; and an image generation unit, adapted to generate an image from the components of the plurality of frequency bands converted by said component conversion unit.

45. An image processing program executing a method of performing a plurality of image processes on an objective image, said program comprising:

code for a decomposition step, of decomposing the objective image into components of a plurality of frequency bands;

code for a degree of change determination step, of determining a degree of change which changes a value of the components corresponding to each of the plurality of image processes;

code for a storage step, of storing the degree of change;

code for a determination step, of determining degree of conversion of the components on the basis of the degree of change stored in said storage step;

code for a component conversion step, of converting the value of the components on the basis of the degree of conversion; and code for an image generation step, of generating an image from the components of the plurality of frequency bands converted in said component conversion step.

46. An image processing program executing a method of performing an image process on an objective image, said program comprising:

code for a storage step, of storing information relating to a tone conversion curve;

code for a decomposition step, of decomposing the objective image into components of a plurality of frequency bands;

code for a degree of change determination step, of determining degree of change which changes a value of the components on the basis of the information relating to the tone conversion curve;

code for a component conversion step, of converting the value of the components on the basis of the degree of change; and code for an image generation step, of generating an image from the components of the plurality of frequency bands converted in said component conversion step.

47. An image processing program executing a method of performing a plurality of image processes for an objective image, said program comprising:

code for a first storage step, of storing information relating to a tone conversion curve;

code for a decomposition step, of decomposing the objective image into components of a plurality of frequency bands;

code for a degree of change determination step, of determining degree of change which changes a value of the components corresponding to each of the plurality of image processes on the basis of the information relating to the tone conversion curve;

code for a second storage step, of storing the degree of change;

code for a determination step, of determining degree of conversion of the components on the basis of the degree of change stored in the second storage step;

code for a component conversion step, of converting the value of the components on the basis of the degree of conversion; and code for an image generation step, of generating an image from the components of the plurality of frequency bands converted in said component conversion step.

48. An image processing program executing a method of performing a plurality of image processes on an objective image, said program comprising:

code for a tone conversion step, of tone-converting the objective image using a tone conversion curve;

code for a decomposition step, of decomposing the tone-converted objective image into components of a plurality of frequency bands;

code for a degree of change determination step, of determining the components with respect to each of the plurality of image processes on the basis of information relating to the tone conversion curve;

code for a storage step, of storing the degree of change;

code for a determination step, of determining degree of conversion on the basis of the degree of change stored in said storage step;

code for a component conversion step, of converting the components on the basis of the change of conversion; and code for an image generation step, of generating an image from the components of the plurality of frequency bands converted in said component conversion step.

49. An image processing program executing a method of performing a plurality of image processes on an objective image, said program comprising:

code for a decomposition step, of decomposing the objective image into components of a plurality of frequency bands;

code for an analysis step, of extracting a component of the plurality of frequency bands corresponding to a noise;

code for a component conversion step, of converting the components corresponding to the noise into a component having a value calculated by values of surrounding components of the components corresponding to the noise; and code for an image generation step, of generating an image from the components of the plurality of frequency bands converted in said component conversion step.

50. A computer readable storage medium which stores a program executing a method of performing a plurality of image processes on an objective image, said program comprising:

code for a decomposition step, of decomposing the objective image into components of a plurality of frequency bands;

code for a degree of change determination step, of determining a degree of change which changes a value of the components corresponding to each of the plurality of image processes;

code for a storage step, of storing the degree of change;

code for a determination step, of determining degree of conversion of the components on the basis of the degree of change stored in said storage step;

code for a component conversion step, of converting the value of the components on the basis of the degree of conversion; and code for an image generation step, of generating an image from the components of the plurality of frequency bands converted in said component conversion step.

51. A computer readable storage medium which stores a program executing a method of performing an image process on an objective image, said program comprising:

code for a storage step, of storing information relating to a tone conversion curve;

code for a decomposition step, of decomposing the objective image into components of a plurality of frequency bands;

code for a degree of change determination step, of determining degree of change which changes a value of the components on the basis of the information relating to the tone conversion curve;

code for a component conversion step, of converting the value of the components on the basis of the degree of change; and code for an image generation step, of generating an image from the components of the plurality of frequency bands converted in said component conversion step.

52. A computer readable storage medium which stores a program executing a method of performing a plurality of image processes for an objective image, said program comprising:

code for a first storage step, of storing information relating to a tone conversion curve;

code for a decomposition step, of decomposing the objective image into components of a plurality of frequency bands;

code for a degree of change determination step, of determining degree of change which changes a value of the components corresponding to each of the plurality of image processes on the basis of the information relating to the tone conversion curve;

code for a second storage step, of storing the degree of change;

code for a determination step, of determining degree of conversion of the components on the basis of the degree of change stored in the second storage step;

code for a component conversion step, of converting the value of the components on the basis of the degree of conversion; and code for an image generation step, of generating an image from the components of the plurality of frequency bands converted in said component conversion step.

53. A computer readable storage medium which stores a program executing a method of performing a plurality of image processes on an objective image, said program comprising:

code for a tone conversion step, of tone-converting the objective image using a tone conversion curve;

code for a decomposition step, of decomposing the tone-converted objective image into components of a plurality of frequency bands;

code for a degree of change determination step, of determining the components with respect to each of the plurality of image processes on the basis of information relating to the tone conversion curve;

code for a storage step, of storing the degree of change;

code for a determination step, of determining degree of conversion on the basis of the degree of change stored in said storage step;

code for a component conversion step, of converting the components on the basis of the change of conversion; and code for an image generation step, of generating an image from the components of the plurality of frequency bands converted in said component conversion step.

54. A computer readable storage medium which stores a program executing a method of performing a plurality of image processes on an objective image, said program comprising:

code for a decomposition step, of decomposing the objective image into components of a plurality of frequency bands;

code for an analysis step, of extracting a component of the plurality of frequency bands corresponding to a noise;

code for a component conversion step, of converting the components corresponding to the noise into a component having a value calculated by values of surrounding components of the components corresponding to the noise; and code for an image generation step, of generating an image from the components of the plurality of frequency bands converted in said component conversion step.

55. A method of performing a plurality of image processes on an objective image, said method comprising:

a decomposition step, of decomposing the objective image into components of a plurality of frequency bands;

a degree of change determination step, of determining a degree of change which changes a value of the components corresponding to each of the plurality of image processes;

a storage step, of storing the degree of change;

a determination step, of determining degree of conversion of the components on the basis of the degree of change stored in said storage step;

a component conversion step, of converting the value of the components on the basis of the degree of conversion; and an image generation step, of generating an image from the components of the plurality of frequency bands converted in said component conversion step.

56. A method of performing an image process on an objective image, said method comprising:

a storage step, of storing information relating to a tone conversion curve;

a decomposition step, of decomposing the objective image into components of a plurality of frequency bands;

a degree of change determination step, of determining degree change which changes a value of the components on the basis of the information relating to the tone conversion curve;

a component conversion step, of converting the value of the components on the basis of the degree of change; and an image generation step, of generating an image from the components of the plurality of frequency bands converted in said component conversion step.

57. A method of performing a plurality of image processes for an objective image, said method comprising;

a first storage step, of storing information relating to a tone conversion curve;

a decomposition step, of decomposing the objective image into components of a plurality of frequency bands;

a degree of change determination step, of determining degree of change which changes a value of the components corresponding to each of the plurality of image processes on the basis of the information relating to the tone conversion curve;

a second storage step, of storing the degree of change;

a determination step, of determining degree of conversion of the components on the basis of the degree of change stored in the second storage step;

a component conversion step, of converting the value of the components on the basis of the degree of conversion; and an image generation step, of generating an image from the components of the plurality of frequency bands converted in said component conversion step.

58. A method of performing a plurality of image processes on an objective image, said method comprising:

a tone conversion step, of tone-converting the objective image using a tone conversion curve;

a decomposition step, of decomposing the tone-converted objective image into components of a plurality of frequency bands;

a degree of change determination step, of determining the components with respect to each of the plurality of image processes on the basis of information relating to the tone conversion curve;

a storage step, of storing the degree of change;

a determination step, of determining degree of conversion on the basis of the degree of change stored in said storage step;

a component conversion step, of converting the components on the basis of the change of conversion; and an image generation step, of generating an image from the components of the plurality of frequency bands converted in said component conversion step.

59. A method of performing a plurality of image processes on an objective image, said method comprising:
- a decomposition step, of decomposing the objective image into components of a plurality of frequency bands;
- an analysis step, of extracting a component of the plurality of frequency bands corresponding to a noise;
- a component conversion step, of converting the components corresponding to the noise into a component having a value calculated by values of surrounding components of the components corresponding to the noise; and
- an image generation step, of generating an image from the components of the plurality of frequency bands converted in said component conversion step.

60. An image processing apparatus for executing a plurality of image processes on an objective image, said apparatus comprising:
- a decomposition unit for decomposing the objective image into coefficients of a plurality of frequency bands;
- a first determination unit for determining a first multiplier indicating a degree of change of the coefficients corresponding to a first image process;
- a second determination unit for determining a second multiplier indicating a degree of change of the coefficients corresponding to a second image process;
- a coefficient conversion unit for determining a final multiplier on the basis of the first and second multipliers, and for converting the coefficients on the basis of the final multiplier; and
- an image generation unit for generating an image on the basis of the coefficients converted by said coefficient conversion unit.

61. An image processing apparatus for executing a plurality of image processes on an objective image, said apparatus comprising:
- a decomposition unit for decomposing the objective image into coefficients of a plurality of frequency bands;
- a first determination unit for changing the coefficients corresponding to a first image process to generate first coefficients;
- a second determination unit for changing the first coefficients corresponding to a second image process to generate second coefficients; and
- an image generation unit for generating an image on the basis of the second coefficients.

62. The apparatus according to claim 60 or 61, wherein the first and second image processes include at least two of a noise removal process, a sharpening process, and a dynamic range change process.

63. The apparatus according to claim 60 or 61, further comprising:
- a tone conversion unit for converting an image using a tone conversion curve,
- wherein at least one of the first and second image processes determines a multiplier indicating a degree of change of the coefficients on the basis of information relating to the tone conversion curve.

64. The apparatus according to claim 63, wherein the information relating to the tone conversion curve is at least one of information of a slope of the tone conversion curve and range information of input value defined by a range of a predetermined output value of the tone conversion curve.

65. The apparatus according to claim 63, wherein the objective image is the image that is converted by said tone conversion unit.

66. The apparatus according to claim 63, wherein said tone conversion unit converts the image generated by said image generation unit.

67. The apparatus according to claim 63, further comprising a change unit for changing a curve form of the tone conversion curve.

68. The apparatus according to claim 63, further comprising a display unit for displaying an image, wherein the objective image is converted by the tone conversion unit.

69. The apparatus according to claim 60 or 61, wherein said decomposition unit decomposes the objective image into coefficients using a transformation method of at least one of a wavelet transformation process using a wavelet filter, a Laplacian pyramid transformation using a Laplacian filter, and a transformation process using a filter without any subband transformation.

70. The apparatus according to claim 69, wherein the coefficients values are determined on the basis of a filter process using a filter.

71. The apparatus according to claim 60 or 61, further comprising:
- an X-ray generation unit for generating an X-ray; and
- a two-dimensional sensor for converting the X-ray into an image,
- wherein the objective image is at least one of the image sensed by said two-dimensional sensor and an image processed by a predetermined process for said two-dimensional sensor.

72. An image processing system formed by connecting a plurality of apparatuses for executing a plurality of image processes on an objective image, said system comprising:
- a decomposition unit for decomposing the objective image into coefficients of a plurality of frequency bands;
- a first determination unit for determining a first multiplier indicating a degree of change of the coefficients corresponding to a first image process;
- a second determination unit for determining a second multiplier indicating a degree of change of the coefficients corresponding to a second image process;
- a coefficient conversion unit for determining a final multiplier on the basis of the first and second multipliers, and for converting the coefficients on the basis of the final multiplier; and
- an image generation unit for generating an image on the basis of the coefficients converted by said coefficient conversion unit.

73. An image processing system formed by connecting a plurality of apparatuses for executing a plurality of image processes on an objective image, said system comprising:
- a decomposition unit for decomposing the objective image into coefficients of a plurality of frequency bands;
- a first determination unit for changing the coefficients corresponding to a first image process to generate first coefficients;
- a second determination unit for changing the first coefficients corresponding to a second image process to generate second coefficients; and
- an image generation unit for generating an image on the basis of the second coefficients.

74. A program executing a method of performing a plurality of image processes on an objective image, said program comprising:

code for a decomposition step, of decomposing the objective image into coefficients of a plurality of frequency bands;

code for a first determination step, of determining a first multiplier indicating a degree of change of the coefficients corresponding to a first image process code for a second determination unit step, of determining a second multiplier indicating a degree of change of the coefficients corresponding to a second image process;

code for a coefficient conversion step, of determining a final multiplier on the basis of the first and second multipliers, and for converting the coefficients on the basis of the final multiplier; and code for an image generation step, of generating an image on the basis of the coefficients converted in said coefficient conversion step.

75. A program executing a method of performing a plurality of image processes on an objective image, said program comprising:

code for a decomposition step, of decomposing the objective image into coefficients of a plurality of frequency bands;

code for a first determination step, of changing the coefficients corresponding to a first image process to generate first coefficients;

code for a second determination step, of changing the first coefficients corresponding to a second image process to generate second coefficients; and code for an image generation step, of generating an image on the basis of the second coefficients.

76. A computer readable storage medium which stores a program executing a method of performing a plurality of image processes on an objective image, said program comprising:

code for a decomposition step, of decomposing the objective image into coefficients of a plurality of frequency bands;

code for a first determination step, of determining a first multiplier indicating a degree of change of the coefficients corresponding to a first image process;

code for a second determination unit step, of determining a second multiplier indicating a degree of change of the coefficients corresponding to a second image process;

code for a coefficient conversion step, of determining a final multiplier on the basis of the first and second multipliers, and for converting the coefficients on the basis of the final multiplier; and code for an image generation step, of generating an image on the basis of the coefficients converted in said coefficient conversion step.

77. A computer readable storage medium which stores a program executing a method of performing a plurality of image processes on an objective image, said program comprising:

code for a decomposition step, of decomposing the objective image into coefficients of a plurality of frequency bands;

code for a first determination step, of changing the coefficients corresponding to a first image process to generate first coefficients;

code for a second determination step, of changing the first coefficients corresponding to a second image process to generate second coefficients; and code for an image generation step, of generating an image on the basis of the second coefficients.

78. An image processing method of executing a plurality of image processes on an objective image, said method comprising:

a decomposition step, of decomposing the objective image into coefficients of a plurality of frequency bands;

a first determination step, of determining a first multiplier indicating a degree of change of the coefficients corresponding to a first image process;

a second determination unit step, of determining a second multiplier indicating a degree of change of the coefficients corresponding to a second image process;

a coefficient conversion step, of determining a final multiplier on the basis of the first and second multipliers, and for converting the coefficients on the basis of the final multiplier; and an image generation step, of generating an image on the basis of the coefficients converted in said coefficient conversion step.

79. An image processing method of executing a plurality of image processes on an objective image, said method comprising:

a decomposition step, of decomposing the objective image into coefficients of a plurality of frequency bands;

a first determination step, of changing the coefficients corresponding to a first image process to generate first coefficients;

a second determination step, of changing the first coefficients corresponding to a second image process to generate second coefficients; and an image generation step, of generating an image on the basis of the second coefficients.

* * * * *

UNITED STATES PATENT AND TRADEMARK OFFICE
CERTIFICATE OF CORRECTION

PATENT NO. : 6,813,335 B2
DATED : November 2, 2004
INVENTOR(S) : Hiroyuki Shinbata It is certified that error appears in the above-identified patent and that said Letters Patent is hereby corrected as shown below:

<u>Title page,</u>
Item [56], References Cited, OTHER PUBLICATIONS,
"Andrew Laine" reference, "Acad mic" should read -- Academic --.

<u>Column 2,</u>
Line 3, "have" should read -- has --.

<u>Column 17,</u>
Line 11, "overshoot over" should read -- overshoot or --.

<u>Column 34,</u>
Line 19, "include" should read -- includes --.
Line 42, "efficient" should read -- coefficient --.

<u>Column 35,</u>
Line 28, "teristic." should read -- teristics. --.
Line 65, "include" should read -- includes --.

<u>Column 36,</u>
Line 2, "image processes" should read -- image process --.

<u>Column 37,</u>
Line 33, "include" should read -- includes --.
Line 34, "two" should read -- two of --.
Line 56, "include" should read -- includes --.

UNITED STATES PATENT AND TRADEMARK OFFICE
CERTIFICATE OF CORRECTION

PATENT NO.     : 6,813,335 B2
DATED          : November 2, 2004
INVENTOR(S)    : Hiroyuki Shinbata It is certified that error appears in the above-identified patent and that said Letters Patent is hereby corrected as shown below:

Column 41,
Line 28, "the" should be deleted.

Column 49,
Line 6, "process" should read -- process; --.

Signed and Sealed this

Twenty-first Day of February, 2006

JON W. DUDAS
*Director of the United States Patent and Trademark Office*